United States Patent
Khan et al.

(10) Patent No.: US 10,491,443 B1
(45) Date of Patent: *Nov. 26, 2019

(54) METHODS AND SYSTEMS FOR SELECTIVE CREST FACTOR REDUCTION AND DIGITAL PRE-DISTORTION IN WIRELESS TRANSMITTERS

(71) Applicant: Phazr, Inc., Allen, TX (US)

(72) Inventors: Farooq Khan, Allen, TX (US);
Sidharth Balasubramanian, Garland, TX (US)

(73) Assignee: Phazr, Inc., Allen, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,777

(22) Filed: Aug. 21, 2018

(51) Int. Cl.
*H04L 27/26* (2006.01)
*H04L 25/03* (2006.01)
*H04B 1/04* (2006.01)

(52) U.S. Cl.
CPC .......... *H04L 27/2623* (2013.01); *H04B 1/04* (2013.01); *H04L 25/03859* (2013.01); *H04B 2001/0425* (2013.01); *H04B 2201/70706* (2013.01)

(58) Field of Classification Search
CPC . H04L 27/2623; H04L 25/03859; H04B 1/04; H04B 2001/0425; H04B 2201/70706
USPC ........................................................ 375/260
See application file for complete search history.

(56) References Cited

U.S. PATENT DOCUMENTS

| 2013/0015917 | A1* | 1/2013 | Ishikawa | H03F 1/3247 330/149 |
| 2013/0064325 | A1* | 3/2013 | Kilambi | H03F 1/3247 375/297 |
| 2014/0197885 | A1* | 7/2014 | Fudaba | H03F 1/3247 330/149 |
| 2019/0068234 | A1* | 2/2019 | Khlat | H04B 1/40 |

* cited by examiner

*Primary Examiner* — Juan A Torres
(74) *Attorney, Agent, or Firm* — Michael A. Rahman

(57) ABSTRACT

A method for wireless communication includes allocating a transmission bandwidth for transmission to a user equipment (UE). The method further includes determining if the allocated transmission bandwidth is less than or equal to a maximum estimated $BW_{DPD}$. The maximum estimated $BW_{DPD}$ is the maximum estimated signal bandwidth that a transmitter is configured to digitally pre-distort. The method also includes digitally pre-distorting transmit signals and transmitting the digitally pre-distorted transmit signals to the UE if the allocated transmission bandwidth is less than or equal to the maximum estimated $BW_{DPD}$. The method also includes transmitting to the UE without digitally pre-distorting the signals if the allocated transmission bandwidth is not less than or equal to the maximum estimated $BW_{DPD}$. The method also includes applying digital crest factor reduction to the transmit signals if the allocated transmission bandwidth is less than or equal to the maximum estimated $BW_{CFR}$.

35 Claims, 19 Drawing Sheets

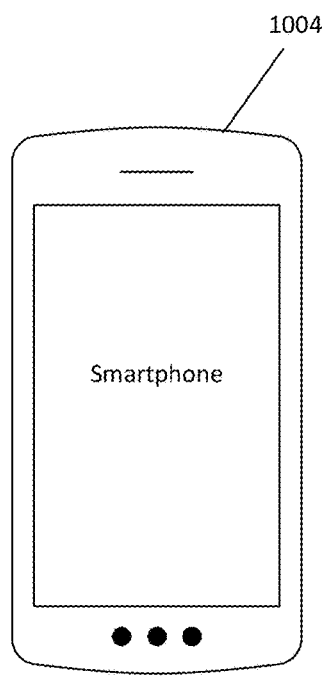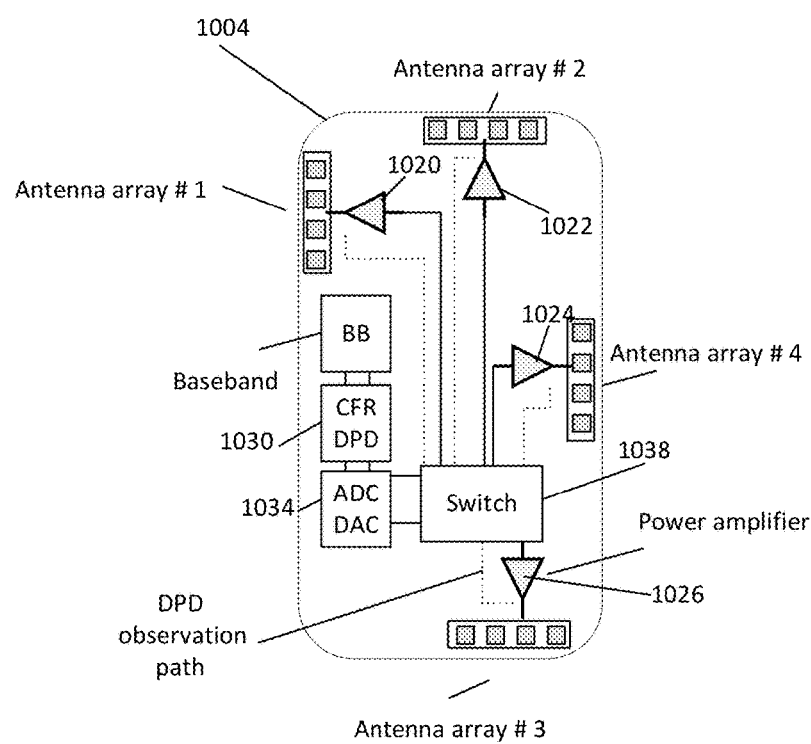
FIG. 10A
FIG. 10B

METHODS AND SYSTEMS FOR SELECTIVE CREST FACTOR REDUCTION AND DIGITAL PRE-DISTORTION IN WIRELESS TRANSMITTERS

BACKGROUND

The invention relates to wireless communications, and in particular relates to methods and systems for selective crest factor reduction and digital pre-distortion based on transmission bandwidth.

DESCRIPTION OF THE RELATED ART

Wireless communication networks are widely deployed to provide various communication services such as voice, video, messaging, packet data, unicast, multicast, broadcast, and the like. Currently, wireless networks are typically operated using one of two popular standards: a wide area network (WAN) standard referred to as The Fourth Generation Long Term Evolution (4G LTE) system; and a local area network (LAN) standard called Wi-Fi. Wi-Fi is generally used indoors as a short-range wireless extension of wired broadband systems, whereas the 4G LTE systems provide wide area long-range connectivity both outdoors and indoors using dedicated infrastructure such as cell towers and backhaul to connect to the Internet.

As more people connect to the Internet, increasingly chat with friends and family, watch and upload videos, listen to streamed music, and indulge in virtual or augmented reality, data traffic continues to grow exponentially. In order to address the continuously growing wireless capacity challenge, the next generation of LAN and WAN systems are relying on higher frequencies referred to as millimeter waves in addition to currently used frequency bands below 7 GHz. The next generation of wireless WAN standard referred to as 5G New Radio (NR) is under development in the Third Generation Partnership Project (3GPP). The 3GPP NR standard supports both sub-7 GHz frequencies as well as millimeter wave bands above 24 GHz. In 3GPP standard, frequency range 1 (FR1) covers frequencies in the 0.4 GHz-6 GHz range. Frequency range 2 (FR2) covers frequencies in the 24.25 GHz-52.6 GHz range. Table 1 provides examples of millimeter wave bands including FR2 bands that may be used for wireless high data-rate communications. Table 2 separately lists examples of FR2 bands in the 3GPP standard. In the millimeter wave bands above 24 GHz, a time division duplexing (TDD) scheme is generally preferred. However, regulations in most parts of the World allow using other duplexing schemes including frequency division duplexing (FDD).

TABLE 1

Examples of millimeter wave bands

| Bands [GHz] | Frequency [GHz] | Bandwidth [GHz] |
|---|---|---|
| 26 GHz Band | 24.25-27.5 | 3.250 |
| LMDS Band | 27.5-28.35 | 0.850 |
|  | 29.1-29.25 | 0.150 |
|  | 31-31.3 | 0.300 |
| 32 GHz Band | 31.8-33.4 | 1.600 |
| 39 GHz Band | 38.6-40 | 1.400 |
| 37/42 GHz Bands | 37.0-38.6 | 1.600 |
|  | 42.0-42.5 | 0.500 |

TABLE 1-continued

Examples of millimeter wave bands

| Bands [GHz] | Frequency [GHz] | Bandwidth [GHz] |
|---|---|---|
| 47 GHz | 47.2-48.2 | 1.000 |
| 60 GHz | 57-64 | 7.000 |
|  | 64-71 | 7.000 |
| 70/80 GHz | 71-76 | 5.000 |
|  | 81-86 | 5.000 |
| 90 GHz | 92-94 | 2.900 |
|  | 94.1-95.0 |  |
| 95 GHz | 95-100 | 5.000 |
| 105 GHz | 102-105 | 7.500 |
|  | 105-109.5 |  |
| 112 GHz | 111.8-114.25 | 2.450 |
| 122 GHz | 122.25-123 | 0.750 |
| 130 GHz | 130-134 | 4.000 |
| 140 GHz | 141-148.5 | 7.500 |
| 150/160 GHz | 151.5-155.5 | 12.50 |
|  | 155.5-158.5 |  |
|  | 158.5-164 |  |

TABLE 2

Examples of FR2 bands in 3GPP

| 5G-NR Frequency Band | Uplink (UL) and Downlink (DL) operating band | Duplex Mode |
|---|---|---|
| n257 | 26500 MHz-29500 MHz | TDD |
| n258 | 24250 MHz-27500 MHz | TDD |
| n260 | 37000 MHz-40000 MHz | TDD |

Table 3 lists examples of FR1 bands in the 3GPP standard. We refer to the FR1 bands in the 3GPP standard, unlicensed 2.4 GHz and 5 GHz bands, 5.925-6.425 GHz and 6.425-7.125 GHz bands and any other spectrum band below 7 GHz as sub-7 GHz spectrum. The duplexing schemes used in the sub-7 GHz spectrum, among others, can be time division duplexing (TDD), frequency division duplexing (FDD), supplemental downlink (SDL) or supplemental uplink (SUL).

TABLE 3

Examples of FR1 bands in 3GPP

| 5G-NR Frequency Band | Uplink Frequency band | Downlink Frequency band | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |

TABLE 3-continued

Examples of FR1 bands in 3GPP

| 5G-NR Frequency Band | Uplink Frequency band | Downlink Frequency band | Duplex Mode |
|---|---|---|---|
| n82 | 832 MHz-862 MHz | N/A | SUL |
| n83 | 703 MHz-748 MHz | N/A | SUL |
| n84 | 1920 MHz-1980 MHz | N/A | SUL |

In addition to serving mobile devices, the next generation of wireless WAN systems using millimeter wave and sub-7 GHz spectrum are expected to provide high-speed (Gigabits per second) links to fixed wireless broadband routers installed in homes and commercial buildings.

The Fourth Generation Long Term Evolution (4G LTE) system and local area network (LAN) standard called Wi-Fi use orthogonal frequency-division multiplexing (OFDM) for encoding digital data on multiple carrier frequencies due to its high spectral efficiency and robustness against the multipath effect and inter-symbol interference (ISI). A large number of closely spaced orthogonal sub-carriers are modulated with conventional modulation schemes such as BPSK, QPSK, 16-QAM, 64-QAM and 256-QAM. The next generation of wireless WAN standard referred to as 5G New Radio (NR) also uses orthogonal frequency-division multiplexing (OFDM). The transmit signals in an OFDM system exhibit high peak values in the time domain since many subcarrier components are added via an inverse fast Fourier transformation (IFFT) operation. As a result, OFDM systems are known to have a high peak-to-average power ratio (PAPR) when compared to single-carrier systems.

Peak to average power ratio (PAPR) is a major drawback of OFDM system due to the distortion problem in the linear devices such as power amplifier (PA). The distortions affect signal clarity and make it difficult to keep the signal within assigned frequency band causing out-of-band emissions or spectral regrowth and in-band distortion which correlates with an increased bit-error-rate (BER). Base stations and mobile devices risk violating FCC and international regulatory agency standards if they cannot keep spurious amplifier emissions from interfering with adjacent frequencies. To reduce these emissions and achieve more linear amplifier output, base stations and mobile devices can reduce the power output of the amplifier, but this practice also reduces efficiency. Amplifiers operating below peak efficiency for the same output power levels dissipate more energy, resulting in overheating, thus requiring expensive cooling equipment.

SUMMARY

Various aspects of the present disclosure are directed to methods and systems for selective crest factor reduction and digital pre-distortion conditional or dependent on transmission bandwidth.

In one aspect of the present disclosure, a method for wireless communication includes allocating a transmission bandwidth for transmission to a first user equipment (UE) and determining if the allocated transmission bandwidth is less than or equal to a first bandwidth threshold value. The method further includes digitally pre-distorting transmit signals and transmitting the digitally pre-distorted transmit signals to the first UE if the allocated transmission bandwidth is less than or equal to the first bandwidth threshold value. The method also includes transmitting to the first UE without digitally pre-distorting the signals if the allocated transmission bandwidth is not less than or equal to the first bandwidth threshold value. In an additional aspect of the disclosure, the first bandwidth threshold value is the maximum estimated $BW_{DPD}$, wherein the maximum estimated $BW_{DPD}$ is the maximum estimated signal bandwidth a transmitter is configured to digitally pre-distort. The method also includes applying digital crest factor reduction to the transmit signals if the allocated transmission bandwidth is less than or equal to a second bandwidth threshold value. In an additional aspect of the disclosure, the second bandwidth threshold value is the maximum estimated $BW_{CFR}$, wherein the maximum estimated $BW_{CFR}$ is the maximum estimated signal bandwidth on which a transmitter is configured to apply digital crest factor reduction.

In an additional aspect of the disclosure, the method includes scheduling a transmission to the first UE in a first transmission time interval (TTI). The method also includes transmitting the digitally pre-distorted transmit signals in the first TTI to the first UE if the allocated transmission bandwidth is less than or equal to the maximum estimated $BW_{DPD}$. The method also includes transmitting to the first UE without digitally pre-distorting the transmit signals in the first TTI if the allocated transmission bandwidth is not less than or equal to the maximum estimated $BW_{DPD}$.

In an additional aspect of the disclosure, the method includes scheduling a transmission to a second UE in a second TTI and allocating a transmission bandwidth for transmission to the second UE. The method includes determining if the allocated transmission bandwidth to the second UE is less than or equal to the maximum estimated $BW_{DPD}$, wherein the maximum estimated $BW_{DPD}$ is the maximum estimated signal bandwidth that a transmitter is configured to digitally pre-distort. The method includes digitally pre-distorting transmit signals and transmitting the digitally pre-distorted transmit signals to the second UE in the second TTI if the allocated transmission bandwidth is less than or equal to the maximum estimated $BW_{DPD}$. The method includes transmitting to the second UE in the second TTI without digitally pre-distorting the signals if the allocated transmission bandwidth is not less than or equal to the maximum estimated $BW_{DPD}$.

In an additional aspect of the disclosure, a method for wireless communication includes scheduling transmissions to at least first and second user equipment (UEs) in a first transmission time interval (TTI) and allocating respective transmission bandwidths for transmission in the first TTI to the first and second UEs. The method also includes determining if the total allocated transmission bandwidth in the first TTI is less than or equal to a maximum estimated $BW_{DPD}$, wherein the maximum estimated $BW_{DPD}$ is the maximum estimated signal bandwidth that a transmitter is configured to digitally pre-distort. The method also includes digitally pre-distorting transmit signals and transmitting the digitally pre-distorted transmit signals to the first and second UEs in the first TTI if the total allocated transmission bandwidth in the first TTI is less than or equal to the maximum estimated $BW_{DPD}$. The method also includes transmitting to the first and second UEs without digitally pre-distorting the signals if the total allocated transmission bandwidth in the first TTI is not less than or equal to the maximum estimated $BW_{DPD}$.

In an additional aspect of the disclosure, the method includes scheduling a transmission to at least a third UE in a second TTI and allocating a transmission bandwidth for transmission to the third UE. The method also includes determining if the allocated transmission bandwidth to the third UE is less than or equal to the maximum estimated $BW_{DPD}$, wherein the maximum estimated $BW_{DPD}$ is the maximum estimated signal bandwidth that a transmitter is configured to digitally pre-distort. The method also includes digitally pre-distorting transmit signals and transmitting the digitally pre-distorted transmit signals to the third UE in the second TTI if the allocated transmission bandwidth is less than or equal to the maximum estimated $BW_{DPD}$. The method also includes transmitting to the third UE in the second TTI without digitally pre-distorting the signals if the allocated transmission bandwidth is not less than or equal to the maximum estimated $BW_{DPD}$.

In an additional aspect of the disclosure, an apparatus configured for wireless communication includes means for allocating a transmission bandwidth for transmission to a first user equipment (UE). The apparatus also includes means for determining if the allocated transmission bandwidth is less than or equal to a maximum estimated $BW_{DPD}$, wherein the maximum estimated $BW_{DPD}$ is the maximum estimated signal bandwidth that a transmitter is configured to digitally pre-distort. The apparatus also includes means for digitally pre-distorting transmit signals and transmitting the digitally pre-distorted transmit signals to the first UE, wherein the digitally pre-distorted signals are transmitted if the allocated transmission bandwidth is less than or equal to the maximum estimated $BW_{DPD}$. The apparatus also includes means for transmitting to the first UE without digitally pre-distorting the signals, wherein the signals are transmitted without digital pre-distortion if the allocated transmission bandwidth is not less than or equal to the maximum estimated $BW_{DPD}$. The apparatus also includes means for applying digital crest factor reduction to the transmit signals if the allocated transmission bandwidth is less than or equal to the maximum estimated $BW_{CFR}$.

In an additional aspect of the disclosure, the apparatus includes means for scheduling a transmission to the first UE in a first transmission time interval (TTI). The apparatus includes means for transmitting the digitally pre-distorted transmit signals in the first TTI to the first UE if the allocated transmission bandwidth is less than or equal to the maximum estimated $BW_{DPD}$. The apparatus includes means for transmitting to the first UE without digitally pre-distorting the transmit signals in the first TTI if the allocated transmission bandwidth is not less than or equal to the maximum estimated $BW_{DPD}$.

In an additional aspect of the disclosure, the apparatus includes means for scheduling a transmission to a second UE in a second TTI and means for allocating a transmission bandwidth for transmission to the second UE. The apparatus also includes means for determining if the allocated transmission bandwidth to the second UE is less than or equal to the maximum estimated $BW_{DPD}$, wherein the maximum estimated $BW_{DPD}$ is the maximum estimated signal bandwidth that a transmitter is configured to digitally pre-distort. The apparatus also includes means for digitally pre-distorting transmit signals and transmitting the digitally pre-distorted transmit signals to the second UE in the second TTI if the allocated transmission bandwidth is less than or equal to the maximum estimated $BW_{DPD}$. The apparatus also includes means for transmitting to the second UE in the second TTI without digitally pre-distorting the signals if the allocated transmission bandwidth is not less than or equal to the maximum estimated $BW_{DPD}$.

BRIEF DESCRIPTION OF THE DRAWINGS

FIGS. 10A-10B illustrate a smart phone 1004 in accordance with the present disclosure.

DETAILED DESCRIPTION

Figure 1A:
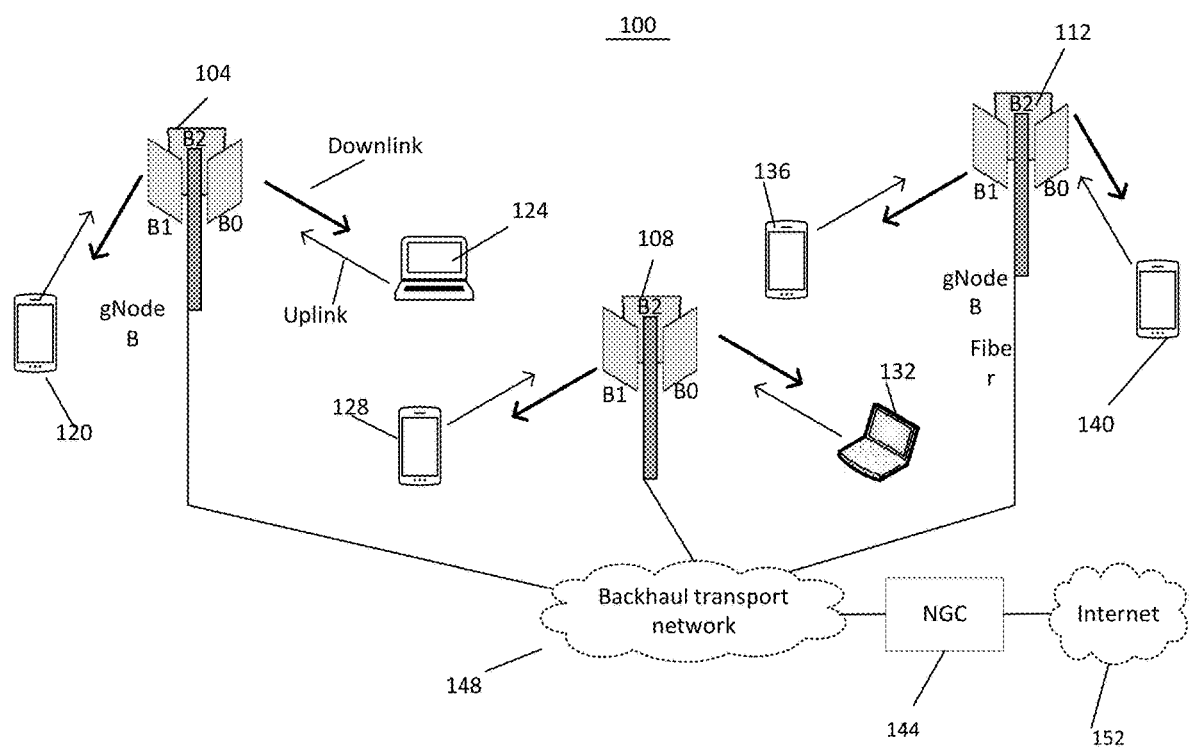
FIG. 1A illustrates a wireless system in accordance with disclosed embodiments.

FIG. 1A illustrates a wireless system 100 in accordance with disclosed embodiments. In the wireless system 100, base stations and communication devices selectively enable crest factor reduction and digital pre-distortion depending on the transmission bandwidth to improve efficiency of wireless transmitters.

Referring to FIG. 1A, peak-to-average power ratios of transmit signals are reduced by applying crest-factor reduction (CFR) techniques. In one exemplary embodiment, application of CFR technique reduces signal peaks by 4-6 dB, with acceptable in-band EVM degradation. Consequently, power amplifiers (PAs) may operate at higher input and output power levels, thereby resulting in higher efficiency while maintaining linearity at the output of the power amplifiers. Also, to enable power amplifiers to exhibit a linear response, transmit signals are digitally pre-distorted prior to amplification by the power amplifiers.

Figure 1B:
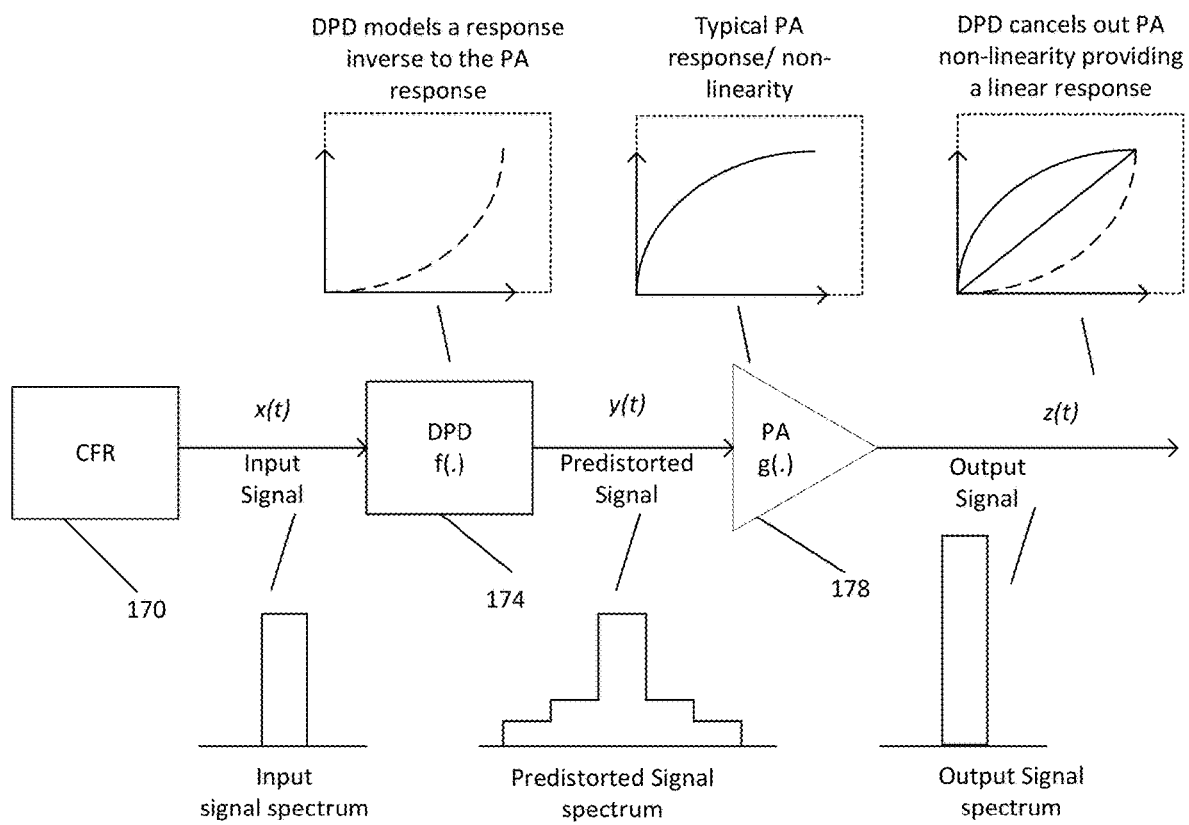
FIG. 1B illustrates application of crest factor reduction and digital pre-distortion in accordance with disclosed embodiments.

Referring to FIG. 1B, a section of a transmit chain is illustrated wherein a CFR module 170 applies crest factor reduction to the transmit signal and outputs a signal x(t). Next, a DPD module 174 digitally pre-distorts the signal x(t) and outputs a signal y(t). The pre-distorted signal y(t) is amplified by a power amplifier 178 which outputs the signal z(t).

According to some embodiments, the DPD module 174 is configured with a transfer function f(.) which is inverse of a transfer function g(.) of the power amplifier 178. As a result, the power amplifier 178 exhibits a linear response when the pre-distorted signal y(t) is applied to its input.

Referring to FIG. 1A, the wireless system 100 includes radio base stations 104, 108 and 112 (also referred to as gNode Bs) that communicate with communication devices 120, 124, 128, 132, 136 and 140 on either millimeter wave spectrum frequency or sub-7 GHz spectrum frequency or both millimeter wave spectrum frequency and sub-7 GHz spectrum frequency. The radio base stations gNode Bs 104, 108 and 112 are connected to a network 144 (e.g., Next Generation Core (NGC) network) using a backhaul transport network 148 (e.g., high-speed Fiber backhaul & Ethernet switches). The network 144 may be connected to the Internet 152. The radio base station 104 serves communication devices 120 and 124, the radio base station 108 serves communication devices 128 and 132, and the radio base station 112 serves communication devices 136 and 140. The communication devices may, for example, be smartphones, laptop computers, desktop computers, augmented reality/virtual reality (AR/VR) devices or any other communication devices.

Figure 2A:
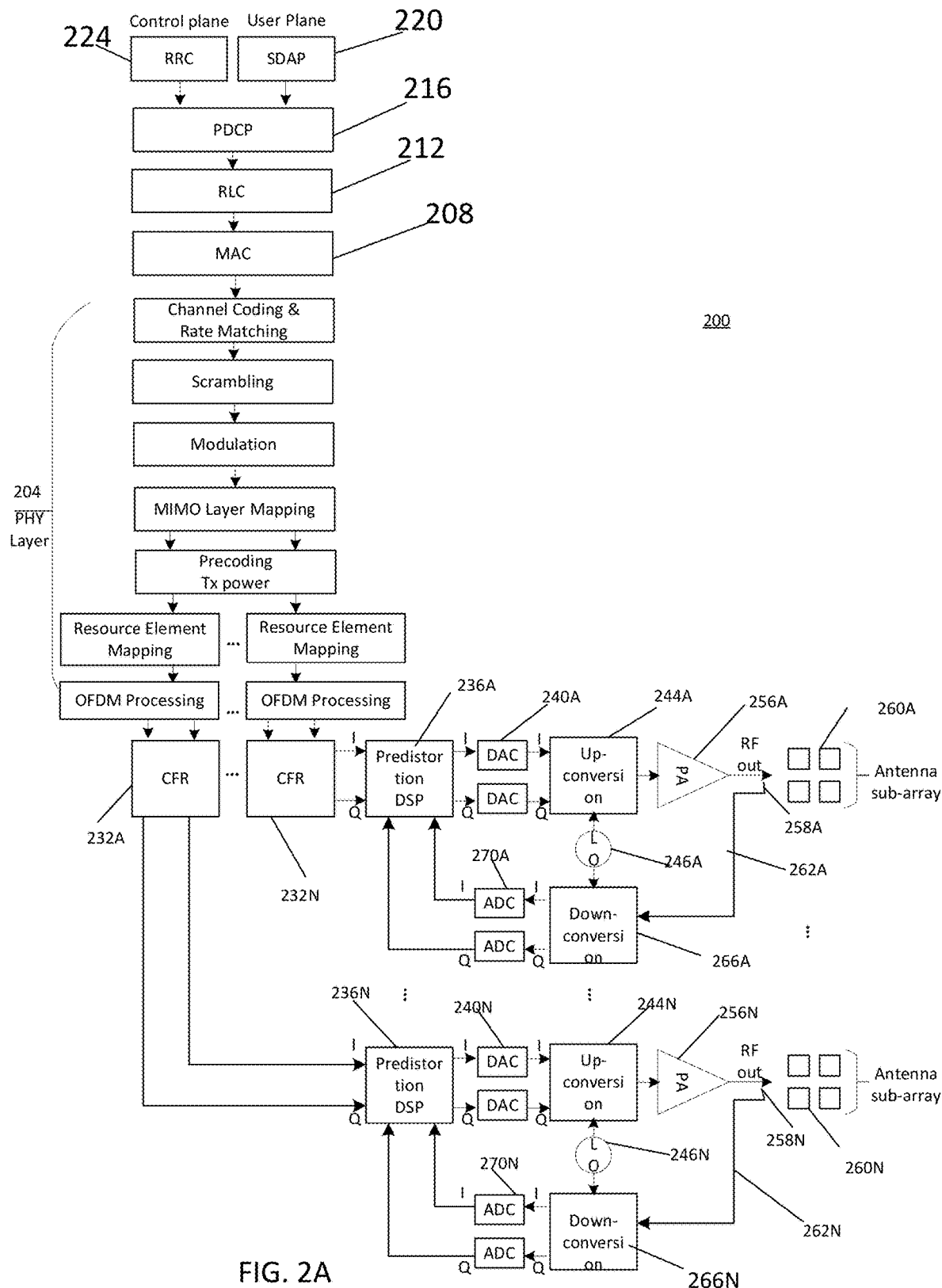
FIGS. 2A-2C are block diagrams of a transmitter in accordance with disclosed embodiments.

FIG. 2A is a block diagram of a transmitter 200 according to embodiments of the present disclosure. The transmitter 200 is configured to operate at millimeter wave bands or at sub-7 GHz frequency bands. The transmitter 200 includes a physical layer 204, a medium access control (MAC) layer 208, a radio link control (RLC) layer 212, a packet data convergence protocol (PDCP) layer 216, and a service data adaptation protocol (SDAP) layer 220. A control plane includes a radio resource control (RRC) layer 224 on top of the PDCP layer 216. The main services and functions of the RRC layer 224 include broadcast of system information, paging, security functions including key management, QoS management functions, UE measurement reporting and control of the reporting, Detection of and recovery from radio link failure and NAS (Non-Access Stratum) message transfer to/from NAS from/to UE. RRC also controls the establishment, configuration, maintenance and release of Signaling Radio Bearers (SRBs) and Data Radio Bearers (DRBs); mobility functions including handover, context transfer, UE cell selection and reselection and control of cell selection and reselection.

The main services and functions of SDAP 220 include mapping between a QoS flow and a data radio bearer and marking QoS flow ID (QFI) in both downlink and uplink packets. The main services and functions of the PDCP 216 for the user plane include: sequence numbering, header compression, header decompression, reordering, duplicate detection, retransmission of PDCP SDUs (Service Data Units), ciphering, deciphering, integrity protection, PDCP SDU discard, duplication of PDCP PDUs (Protocol Data Units), PDCP re-establishment and PDCP data recovery for RLC AM (Acknowledged Mode).

The RLC 212 supports three transmission modes: Transparent Mode (TM), Unacknowledged Mode (UM) and Acknowledged Mode (AM). The main services and functions of the RLC 212 depend on the transmission mode and include: transfer of upper layer PDUs, sequence numbering independent of the one in PDCP (UM and AM), error Correction through ARQ (AM only), segmentation (AM and UM) and re-segmentation (AM only) of RLC SDUs, reassembly of SDU (AM and UM), duplicate detection (AM only), RLC SDU discard (AM and UM), RLC re-establishment and protocol error detection (AM only).

The main services and functions of the MAC layer 208 include: mapping between logical channels and transport channels, multiplexing/demultiplexing of MAC SDUs into/from transport blocks (TB) delivered to/from the physical layer, padding, scheduling information reporting, error correction through Hybrid ARQ, priority handling between UEs by means of dynamic scheduling and priority handling between logical channels.

The main services and functions the high physical layer (PHY-high) 204 include: transport block CRC attachment, code block segmentation, code block CRC attachment, channel coding, physical-layer hybrid-ARQ processing, rate matching, bit-interleaving, modulation (QPSK, 16QAM, 64QAM and 256QAM etc.), layer mapping, pre-coding and mapping to assigned resources and antenna ports. The lower physical layer (PHY-Low) implements OFDM (Orthogonal Frequency Division Multiplexing) processing that includes FFT/IFFT (Fast Fourier Transform/Inverse Fast Fourier Transform) functions as well as addition and removal of cyclic prefix (CP). The physical layer 204 generates multiple digital signal streams for respective MIMO (Multiple Input Multiple Output) transmit paths or chains.

According to embodiments of the present disclosure, the transmitter 200 includes crest factor reduction (CFR) modules 232A-232N for performing CFR on the digital signal streams on the transmit paths. As discussed before, OFDM systems are known to have a high peak-to-average power ratio (PAPR) causing in-band distortion and out-of-band distortion. In-band distortion causes high error vector magnitude (EVM) and degrades performance at desired receivers, and out-of-band distortion causes increased adjacent channel leakage ratio (ACLR) and degrades performance of users in adjacent channels. The CFR modules 232A-232N reduces the output PAPR by clipping and allows additional gain on the output of CFR. As a result, power amplifiers in the transmitter 200 may be operated closer to amplifier compression points which improves amplifier efficiency According to embodiments of the present disclosure, the CFR modules 232A-232N may use one or more algorithms such as, for example, clipping and filtering, peak windowing, peak cancellation and noise shaping. Clipping and filtering algorithm implements hard clipping and low-pass filtering. Peak windowing algorithm smooths sharp corners from hard clipping. In peak windowing algorithm, the clipping is implemented by multiplying the original signal in the region of the peak with a windowing function. Peak cancellation algorithm aims to strike a balance between the out-of-band emission and in-band waveform quality when compressing the signal to a target PAPR. The CFR modules 232A-232N each outputs an in-phase (I) and an out-of-phase (Q) component of the digital signal streams.

According to embodiments of the present disclosure, the outputs of the CFR modules 232A-232N are received by digital pre-distortion (DPD) modules 236A-236N which apply digital pre-distortion to improve linearity of power amplifiers 256A-256N. Without pre-distortion, the power amplifiers 236A-236N may compress their inputs or may exhibit non-linear input/output relationship, which causes output signals to splatter onto adjacent radio frequencies, thus interfering with other radio channels. The DPD modules 236A-236N may introduce inverse distortions into the input of the power amplifiers, thereby canceling non-linearity of the power amplifiers. Thus, the DPD modules 236A-236N act as linearizers when combined with the power amplifiers to reduce the amplifiers' distortion.

Figure 5A:
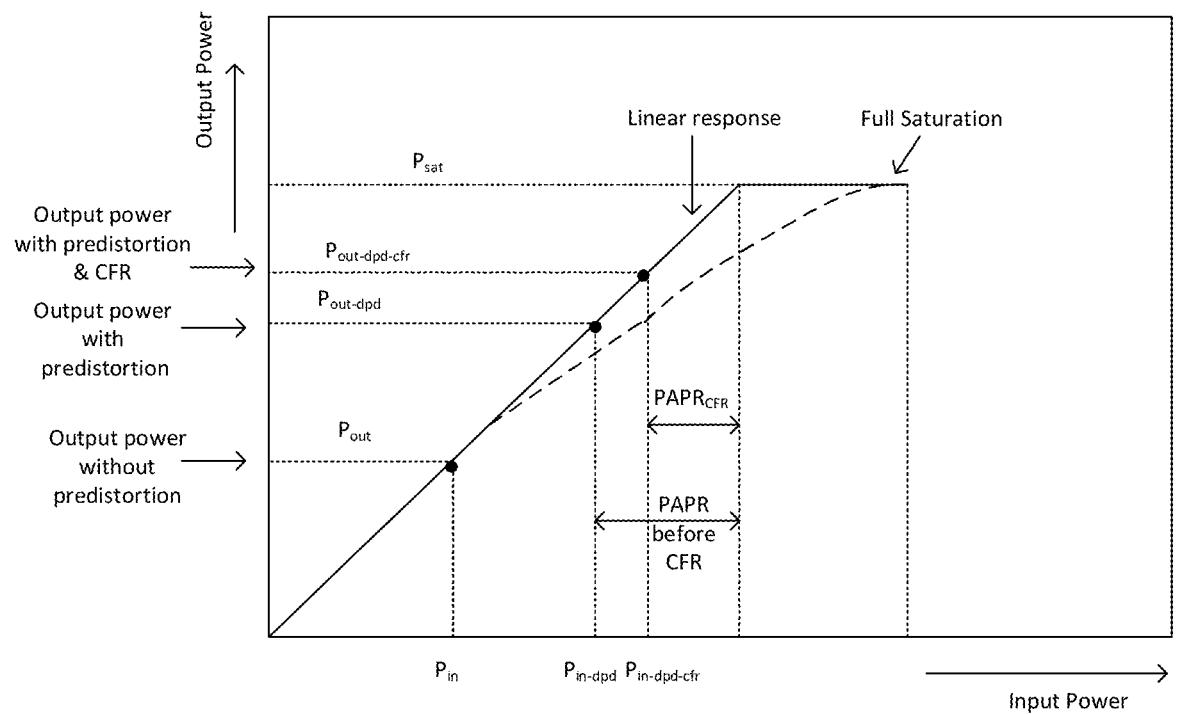
FIG. 5A shows power amplifier input and output powers before and after CFR/DPD.
Figure 5B:
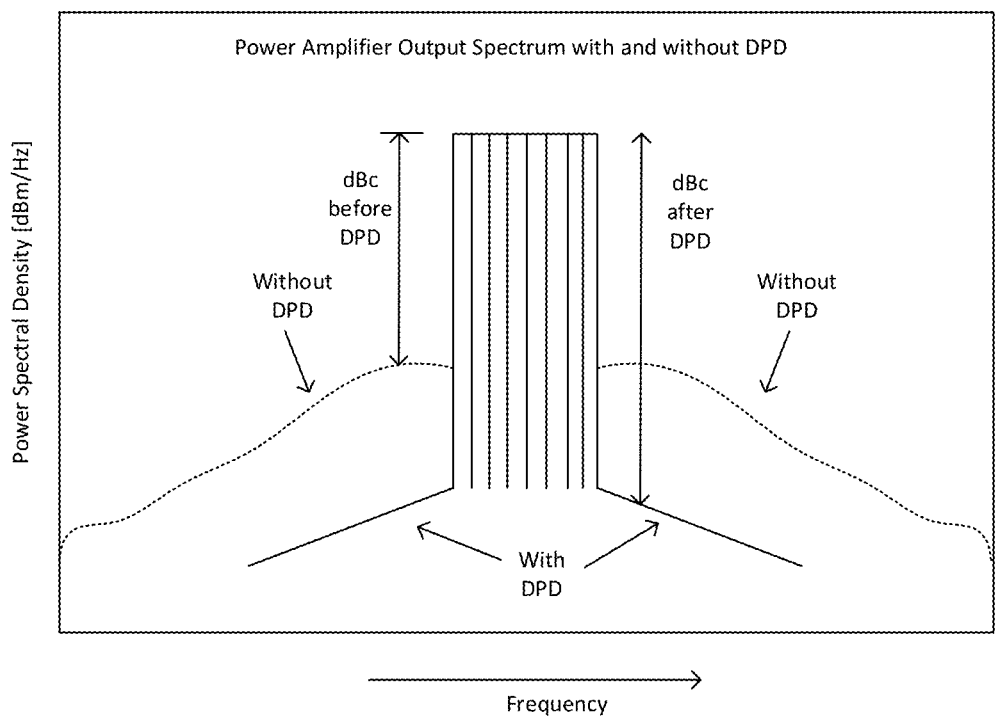
FIG. 5B illustrates power amplifier output spectrum with and without DPD.

FIG. 5A shows amplifier input and output powers before CFR/DPD and amplifier input and output powers after CFR/DPD. By using DPD, we can operate the power amplifier in the non-linear region thus increasing the average input and output power levels Pin and Pout to Pin-dpd and Pout-dpd respectively Using CFR, we reduce the Peak-to-Average Ratio of the signal, then for a given amplitude peak, we can further raise the average output power level to Pout-dpd-cfr with no loss in signal quality. Thus, CFR enables higher power amplifier efficiency by reducing the back-off, often by 6 dB. FIG. 5B illustrates Power Amplifier Output Spectrum with and without DPD showing reduction in Adjacent Channel Power Ratio (ACPR) or Adjacent Channel Leakage Ratio (ACLR) when using DPD.

According to some embodiments of the present disclosure, the transmitter 200 does not include the CFR modules 232A-232N, in which case the DPD modules 236A-236N receives the outputs on each transmit chain from the physical layer 204 and applies digital pre-distortion. Thus, in some embodiments the transmitter 200 may be operated without the CFR modules 232A-232N.

The digital outputs of the DPD modules 236A-236N on the transmit chains are converted to analog signals by digital-to-analog convertors (DACs) 240A-240N. For example, each transmit chain may include two DACs, one for the in-phase (I) component and another for the out-of-phase (Q) component. The analog signals are up-converted to RF signals by up-converters 244A-244N which may be driven by respective local oscillators 246A-246N. The RF signals are amplified by the power amplifiers 256A-256N and finally transmitted wirelessly by antennas 260A-260N.

According to embodiments of the present disclosure, the output of the power amplifiers 256A-256N are sampled or detected by sensors 258A-258N, and the sampled signals are provided, via feedback paths 262A-262N, to down-converters 266A-266N which down-converts the sampled signals. The down-converted signals are digitized by analog to digital converters (ADCs) 270A-270N. The digital outputs from the ADCs 270A-270N are applied as feedback or error signals to the pre-distortion modules 236 A-236N to pre-distort the transmit signals. Thus, the transmitter 200 features a feedback loop comprising the sensors 258A-258N, down-converters 266A-266N, and ADCs 270A-270N, which feeds back error signals to the pre-distortion modules 236A-236N.

As discussed before, the DPD modules 236A-236N introduce non-linearity into the input of the power amplifiers to cancel their non-linear response. The DPD modules 236A-236N calculate the non-linear coefficients of the power amplifiers 236A-236N in order to modify the non-linear response. In order to reliably determine non-linear coefficients of the power amplifiers 256A-256N, the output signals preferably need to be sampled 3 to 5 times the signal bandwidth. Since millimeter wave 5G transmitters typically transmit signals having a large bandwidth, the ADCs 270A-270N must operate at a high sampling rate and the DPD modules 236A-236N must implement complex signal processing circuitry, which increases complexity and power consumption.

Figure 2B:
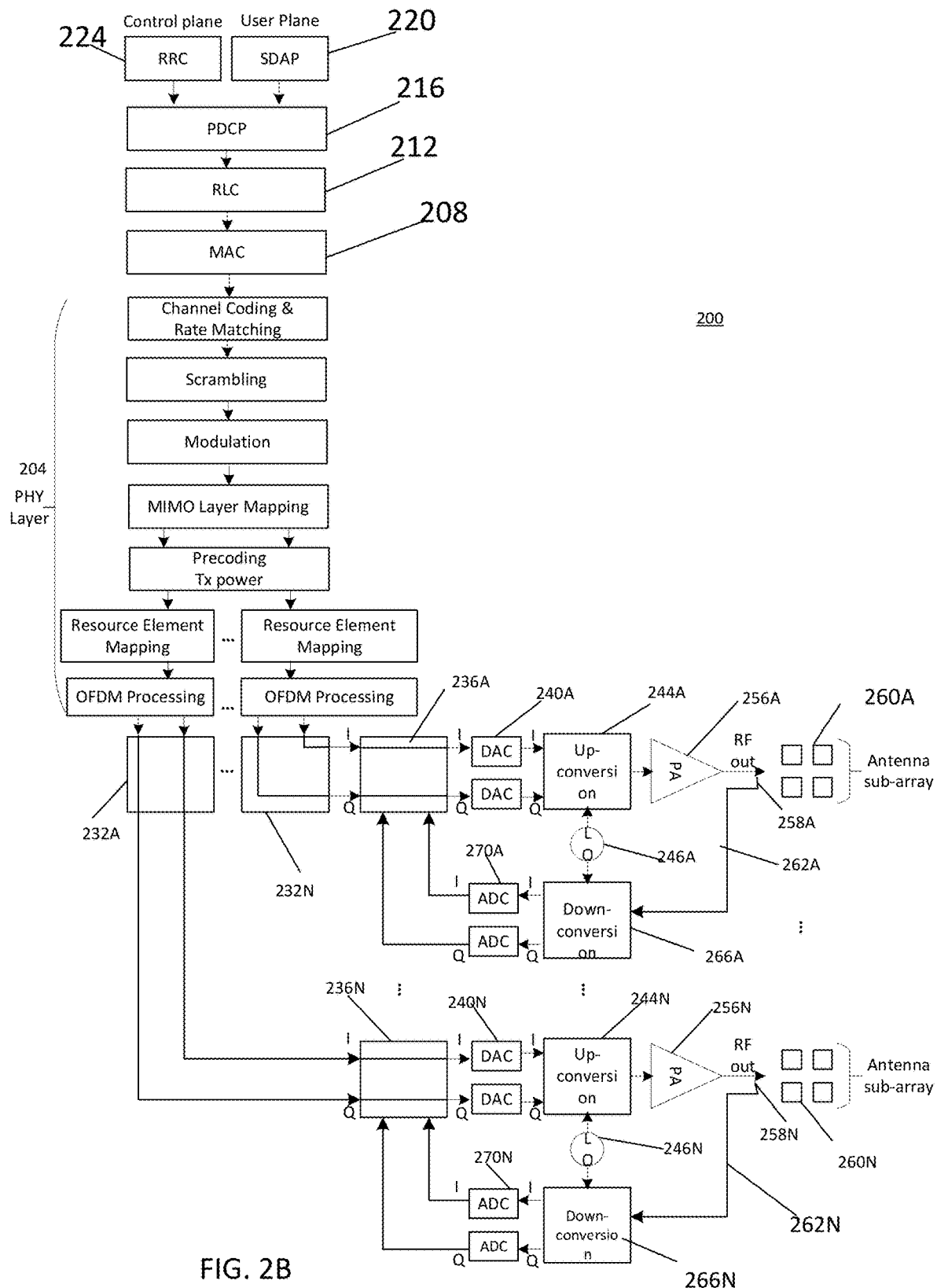
Figure 2C:
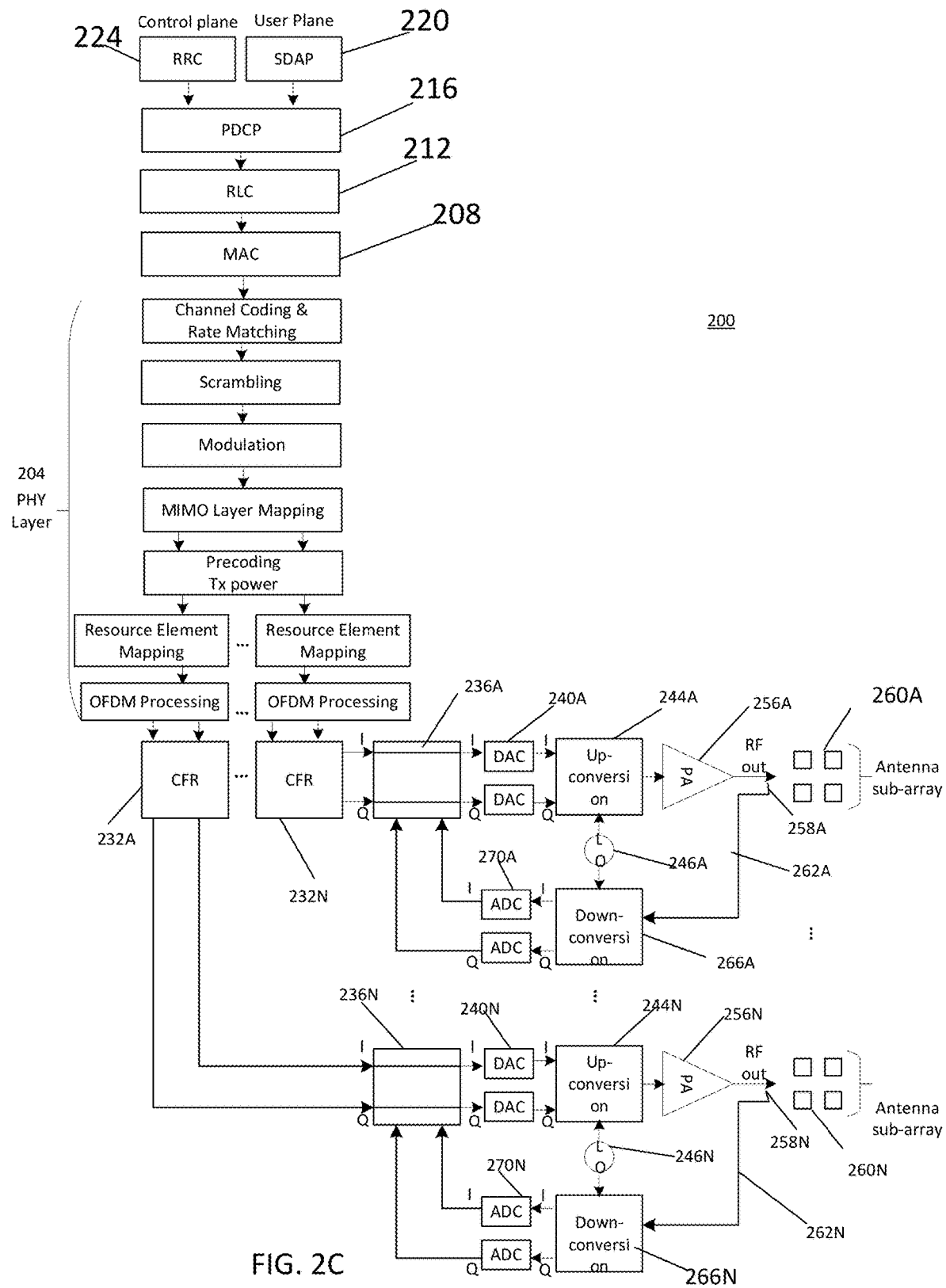

FIG. 2B is a block diagram of the transmitter 200 according to embodiments of the present disclosure where both CFR and DPD modules are bypassed. FIG. 2C is a block diagram of the transmitter 200 according to embodiments of the present disclosure where only DPD modules 236A-236N are bypassed while CFR is applied to the transmit signals. In other embodiments, both CFR and DPD or one of them can be applied to only a subset of the MIMO transmit chains to reduce complexity.

Figure 3A:
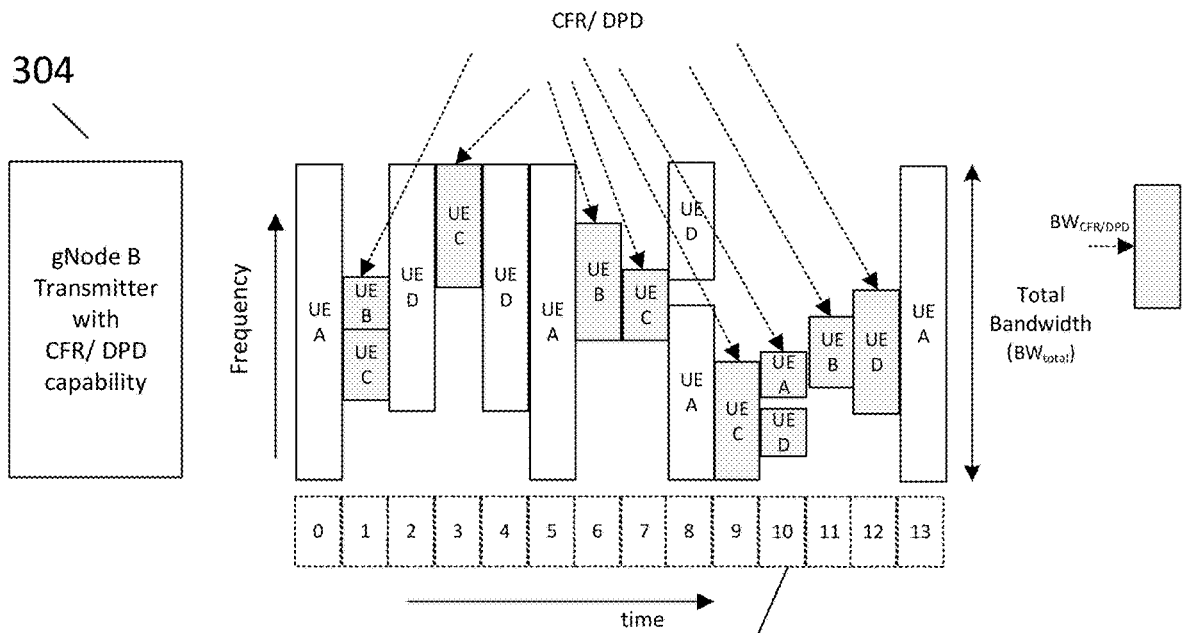
FIG. 3A illustrates a radio base station transmitter in accordance with disclosed embodiments.

FIG. 3A illustrates a radio base station transmitter 304 which transmits data packets to four user equipment (UEs), namely UE(A)-UE(D) in transmission time intervals TTI (0)-TTI(13) in accordance with embodiments of the present disclosure. The transmitter 304 enables CFR/DPD only in those time slots where the total bandwidth used for transmission to one or more UEs is less than or equal to a first bandwidth threshold value. Thus, if the total transmission bandwidth is not less than or equal to the first bandwidth threshold value, CFR/DPD is not enabled and signals are transmitted without application of digital crest factor reduction and digital pre-distortion.

According to some embodiments of the present disclosure, the first bandwidth threshold value is determined based on at least the maximum estimated $BW_{CFR/DPD}$, wherein the maximum estimated $BW_{CFR/DPD}$ is the maximum estimated signal bandwidth on which a transmitter is configured to apply crest factor reduction or apply digital pre-distortion. For example, when a system can support a maximum transmit bandwidth of 800 MHz without CFR or DPD, $BW_{CFR/DPD}$ may be limited to 400 MHz (i.e. 50% of the maximum transmit bandwidth) or to 200 MHz (i.e. 25% of the maximum transmit bandwidth). In other embodiments of the disclosure, the first bandwidth threshold value may be determined based on other parameter values.

According to embodiments of the present disclosure, the maximum estimated $BW_{CFR/DPD}$ is determined using a one or more parameter values of the transmitter such as, for example, sampling rate or the bandwidth of the ADCs 270A-270N, the digital signal processing compute power available to the DPD modules 236A-236N, and the total power consumption constraint of the transmitter. According to some embodiments, the maximum estimated $BW_{CFR/DPD}$ may be determined using one or more parameter values of the transmitter and one or more channel properties. If the total bandwidth used by the transmitter 304 is greater than $BW_{CFR/DPD}$, the CFR modules 232A-232N and the DPD modules 236A-236N are not enabled as illustrated in FIG. 2B.

Figure 3B:
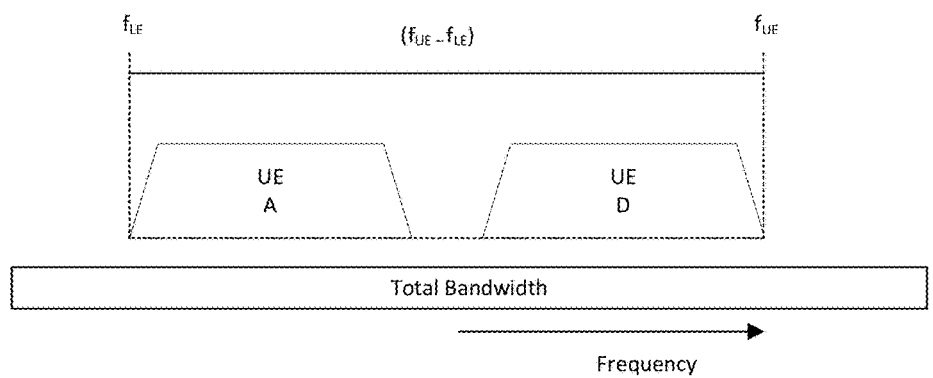
FIG. 3B illustrates a lower frequency edge and an upper frequency edge of allocated bandwidths.

FIG. 3B illustrates a lower frequency edge $f_{LE}$ and an upper frequency edge $f_{UE}$ of allocated bandwidths to UEs. According to disclosed embodiments, if $(f_{UE}-f_{LE}) \leq BW_{CFR/DPD}$, the transmitter 304 enables the CFR and DPD modules and CFR/DPD are applied. If $(f_{UE}-f_{LE}) > BW_{CFR/DPD}$, the transmitter 304 disables or de-activates the CFR and DPD modules.

Referring to FIG. 3A, in TTI(0), transmission to UE(A) is performed without CFR/DPD because the bandwidth used for transmission to UE(A) is greater than the $BW_{CFR/DPD}$. In TTI(1), transmission to UE(B) and UE(C) is performed using CFR/DPD because the sum of bandwidth used for transmission to UE(B) and UE(C) is less than $BW_{CFR/DPD}$. In TTI(2), transmission to UE(D) is performed without CFR/DPD because the bandwidth used for transmission is greater than $BW_{CFR/DPD}$.

The partial bandwidth CFR/DPD allows to keep the gNode B radio base station and UE transmitter complexity low while still providing coverage and transmission range benefit. When a larger transmission coverage range or distance is desired on the downlink or uplink, a small bandwidth that fits within the downlink $BW_{CFR/DPD}$ can be used by the radio base station gNodeB or within the uplink $BW_{CFR/DPD}$ used by the UE to pump more transmission power while still meeting the regulatory requirements of adjacent channel leakage ratio (ACLR).

Figure 4A:
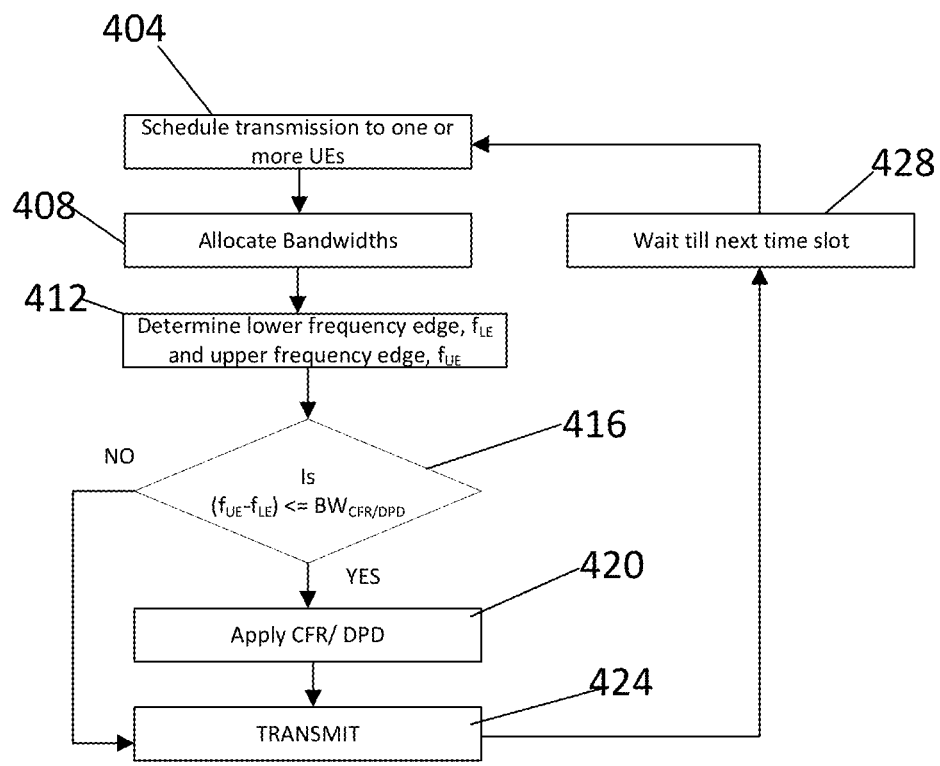
FIGS. 4A-4B are functional block diagrams illustrating example blocks executed to implement aspects of the present disclosure.

FIG. 4A is a functional block diagram illustrating example blocks executed to implement one aspect of the present disclosure. In block 404, the transmitter 304 schedules transmission to one or more UEs. In block 408, bandwidths are allocated for the UEs. The bandwidths may be allocated based on the UE bandwidth support capability, observed channel quality of the particular bandwidth part, required data rates and other Quality of Service (QoS) parameters.

In block 412, lower frequency edge $f_{LE}$ and upper frequency edge $f_{UE}$ of the allocated bandwidths are determined. In block 416, a determination is made if ($f_{UE}-f_{LE}$) is less than or equal to a first bandwidth threshold value. For example, the first bandwidth threshold value may be the maximum estimated $BW_CFR/DPD$ which may be determined using a one or more parameter values of the transmitter. If ($f_{UE}-f_{LE}$) $BW_{CFR/DPD}$, in block 420 the CFR and DPD modules are enabled and crest factor reduction and digital pre-distortion are applied.

In block 424, the transmitter 304 transmits the signals, and in block 428 the transmitter waits until the next time slot prior to transmission. In block 416, if ($f_{UE}-f_{LE}$)> $BW_{CFR/DPD}$, the transmitter 304 disables or de-activates the CFR and DPD modules and transmits signals without CFR and DPD applied in block 424.

Figure 4B:
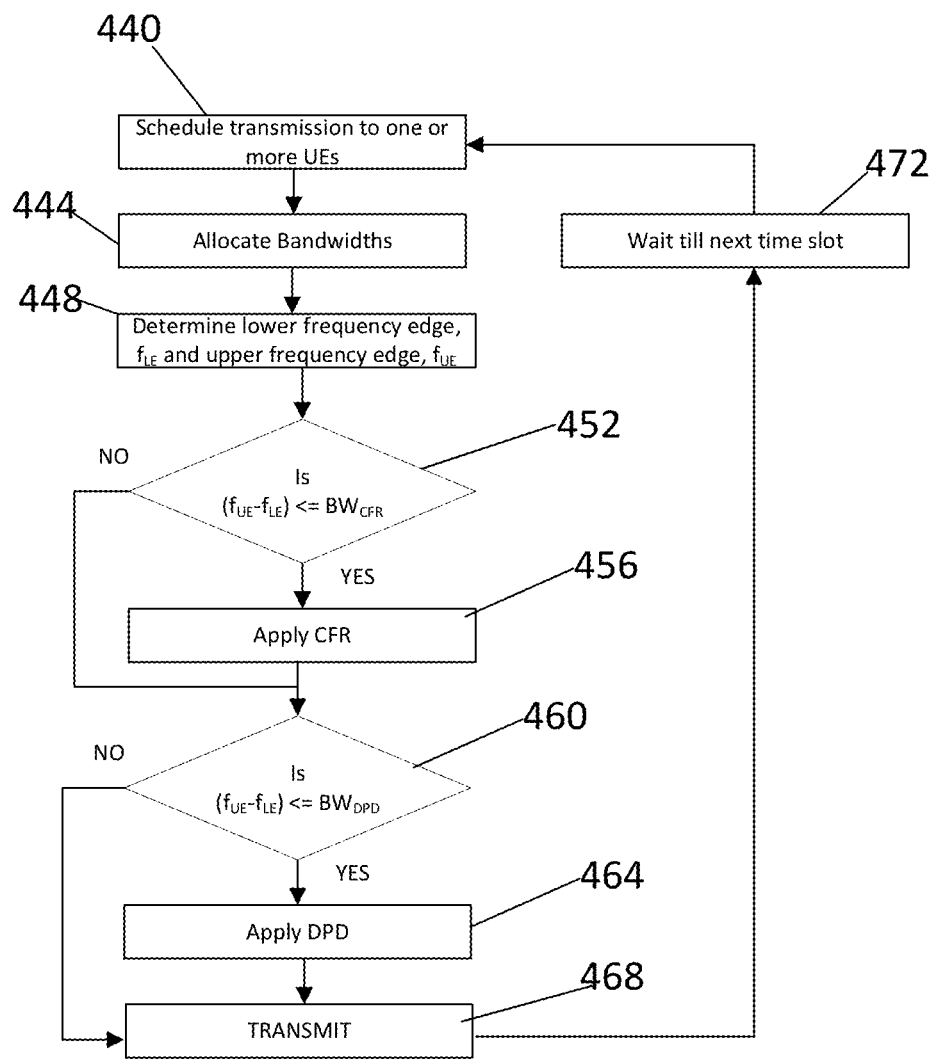

FIG. 4B is a functional block diagram illustrating example blocks executed to implement yet another aspect of the present disclosure. In block 440, the transmitter 304 schedules transmission to one or more UEs. In block 444, bandwidths are allocated for the UEs. The bandwidths may be allocated based on the UE bandwidth support capability, observed channel quality of the particular bandwidth part, required data rates and other Quality of Service (QoS) parameters.

In block 448, lower frequency edge $f_{LE}$ and upper frequency edge $f_{UE}$ of the allocated bandwidths are determined. In block 452, a determination is made if ($f_{UE}-f_{LE}$) is less than or equal to a second bandwidth threshold value. The second bandwidth threshold value may be determined based on may be determined using a one or more parameter values of the transmitter. For example, the second bandwidth threshold value may be $BW_{CFR}$, wherein $BW_{CFR}$ is the maximum estimated signal bandwidth that a transmitter is configured to apply CFR on. For example, when a system can support a maximum transmit bandwidth of 800 MHz without CFR, $BW_{CFR}$ may be limited to 400 MHz (i.e. 50% of the maximum transmit bandwidth) or to 200 MHz (i.e. 25% of the maximum transmit bandwidth). If ($f_{UE}-f_{LE}$)≤ $BW_{CFR}$, in block 456 the CFR modules are enabled and CFR is applied. In block 452, if ($f_{UE}-f_{LE}$)> $BW_{CFR}$, the transmitter 304 disables or de-activates the CFR modules.

In block 460, a determination is made if ($f_{UE}-f_{LE}$) is less than or equal to a third bandwidth threshold value. The third bandwidth threshold value may be determined based on may be determined using a one or more parameter values of the transmitter. For example, the third bandwidth threshold value may be $BW_{DPD}$, wherein $BW_{DPD}$ is the maximum estimated signal bandwidth that a transmitter is configured to apply digital pre-distortion on. For example, when a system can support a maximum transmit bandwidth of 800 MHz without digital pre-distortion, $BWD_{PD}$ may be limited to 400 MHz (i.e. 50% of the maximum transmit bandwidth) or to 200 MHz (i.e. 25% of the maximum transmit bandwidth). Note $BW_{DPD}$ maybe different than $BW_{CFR}$. For example, when system can support a maximum transmit bandwidth of 800 MHz without DPD, $BW_{CFR}$ may be limited to 400 MHz (i.e. 50% of the maximum transmit bandwidth) and $BW_{DPD}$ may be limited to 200 MHz (i.e. 25% of the maximum transmit bandwidth). If ($f_{UE}-f_{LE}$)≤ $BW_{DPD}$, in block 464 the DPD modules are enabled and digital pre-distortion is applied. In block 468, the transmitter 304 transmits the signals, and in block 472 the transmitter waits until the next time slot prior to transmission. In block 460, if ($f_{UE}-f_{LE}$)> $BW_{DPD}$, the transmitter 304 disables or de-activates the DPD modules and transmits signals in block 468.

Figure 6A:
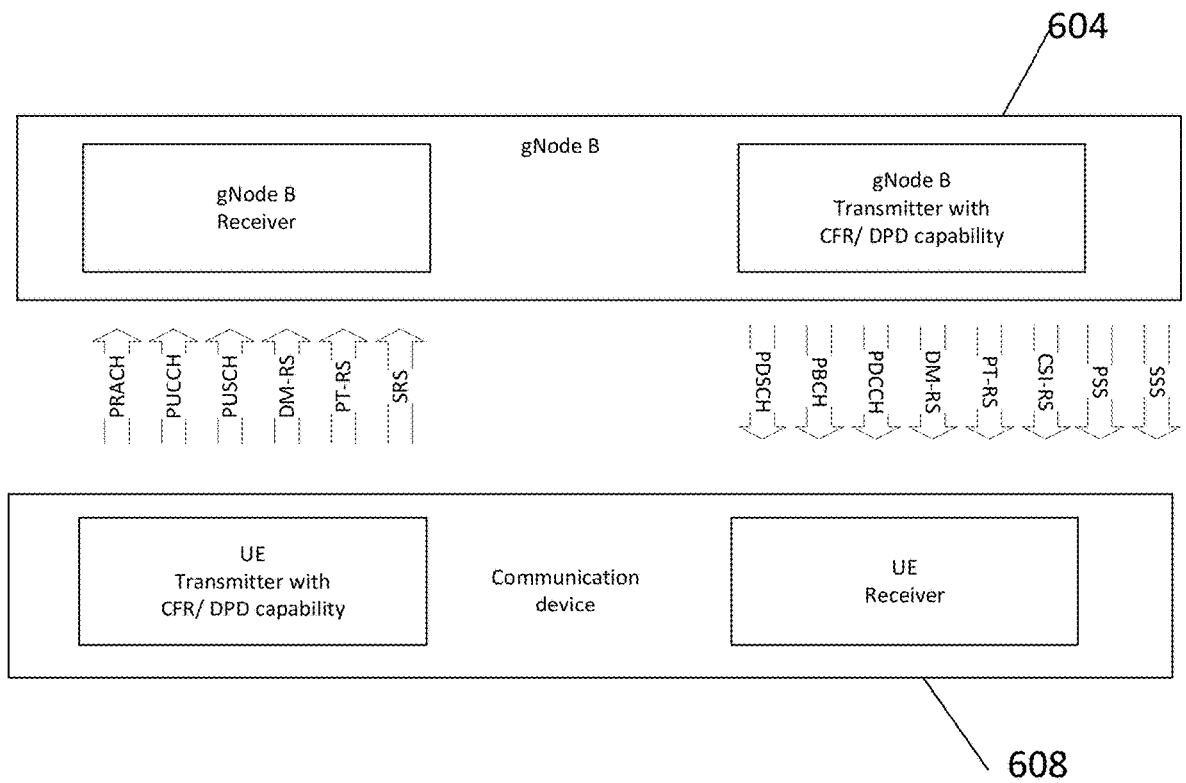
FIG. 6A illustrates physical channels and physical signals.

FIG. 6A illustrates uplink physical channels and uplink physical signals transmission and reception, and downlink physical channels and downlink physical signals transmission and reception according to some disclosed embodiments. An uplink physical channel corresponds to a set of resource elements carrying information originating from higher layers. The uplink physical channels transmitted from a communication device 608 and received by a radio base station 604 include: Physical Uplink Shared Channel (PUSCH), Physical Uplink Control Channel (PUCCH), Physical Random Access Channel (PRACH). An uplink physical signal is used by the physical layer but does not carry information originating from higher layers. The uplink physical signals transmitted from the communication device 608 and received by the radio base station 604 on include: Demodulation reference signals (DM-RS), Phase-tracking reference signals (PT-RS) and Sounding reference signal (SRS).

A downlink physical channel corresponds to a set of resource elements carrying information originating from higher layers. The downlink physical channels transmitted from the radio base station 604 and received by the communication device 608 include: Physical Downlink Shared Channel (PDSCH), Physical Broadcast Channel (PBCH) and Physical Downlink Control Channel (PDCCH). A downlink physical signal corresponds to a set of resource elements used by the physical layer but does not carry information originating from higher layers. The downlink physical signals transmitted from the radio base station 604 and received by the communication device 608 include: Demodulation reference signals (DM-RS), Phase-tracking reference signals (PT-RS) Channel-state information reference signal (CSI-RS) Primary synchronization signal (PSS) and Secondary synchronization signal (SSS).

Figure 6B:
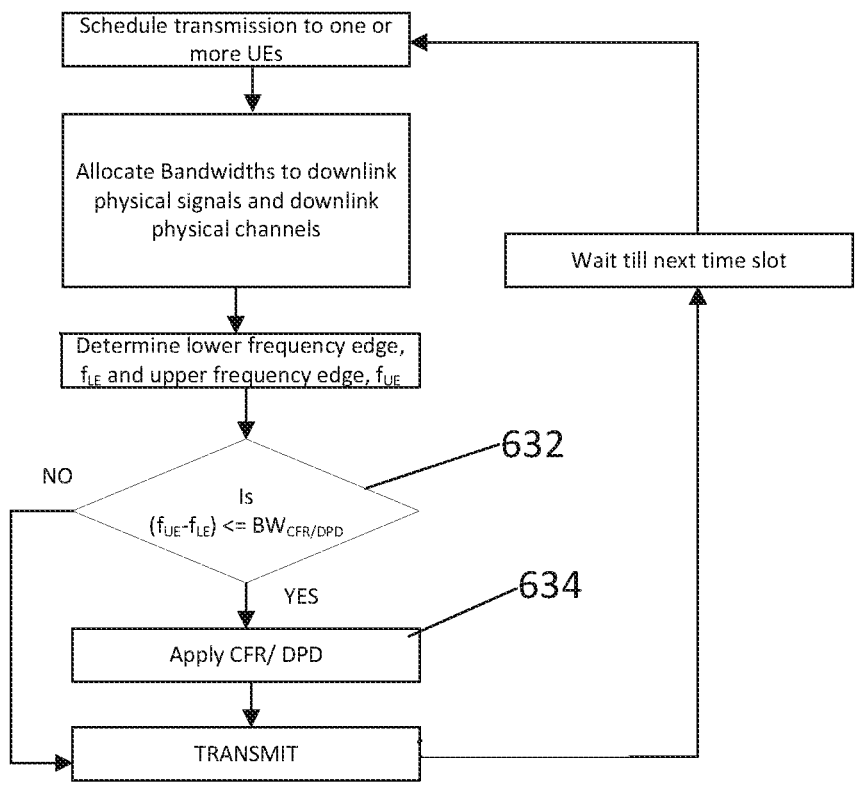
FIGS. 6B-6C are functional block diagrams illustrating example blocks executed to implement aspects of the present disclosure

According to embodiments of the present disclosure, the radio base station gNode B 604 and the communication device 608 uses partial bandwidth DPD. Referring to block 632 of a functional block diagram of FIG. 6B, a determination is made if the total bandwidth used by the downlink physical signals and downlink physical channels in the gNode B transmitter is less than or equal to the $DLBW_{CFR/DPD}$. If the total bandwidth used by the downlink physical signals and downlink physical channels in the gNode B transmitter is less than or equal to the $DLBW_{CFR/DPD}$, in block 634 CFR/DPD is activated. $DLBW_{CFR/DPD}$ refers to the downlink CFR/DPD bandwidth. When the total bandwidth used by the downlink physical signals and downlink physical channels in the gNode B transmitter is greater than the $DLBW_{CFR/DPD}$, CFR/DPD is not used, and thus block 634 is bypassed.

Figure 6C:
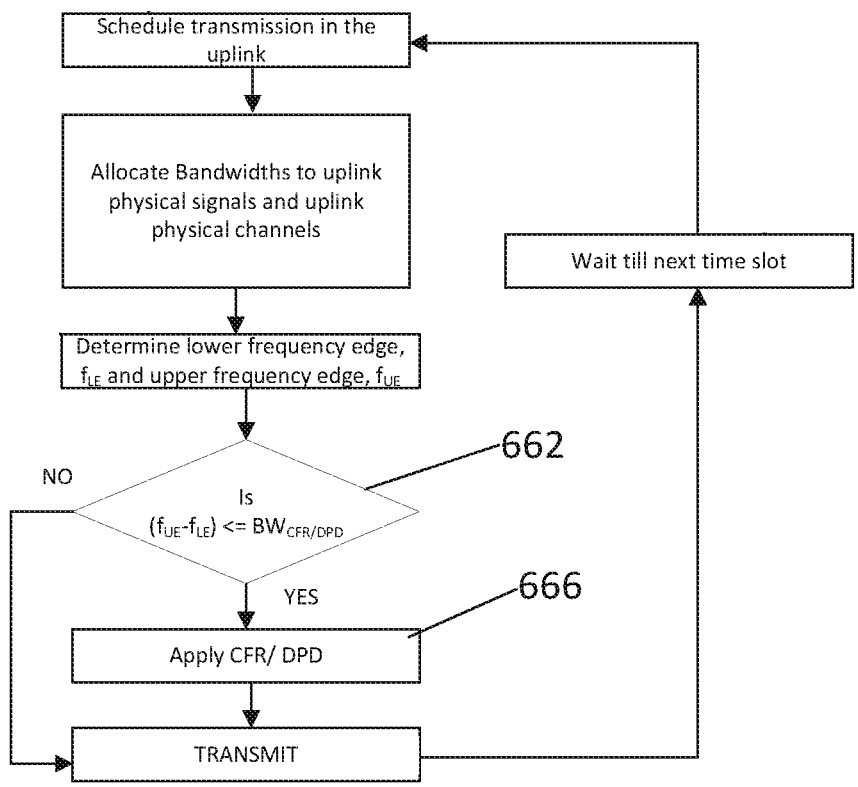

FIG. 6C is a functional block diagram of steps executed for application of CFR/DPD during transmission of uplink physical signals and uplink physical channels. As shown in blocks 662 and 666, when the total bandwidth used by the uplink physical signals and uplink physical channels in the UE transmitter is less than or equal to the $ULBW_{CFR/DPD}$, CFR/DPD is activated. $ULBW_{CFR/DPD}$ refers to the uplink CFR/DPD bandwidth. Note that the $ULBW_{CFR/DPD}$ can be different for different UEs based on UE capability. When the total bandwidth used by the uplink physical signals and uplink physical channels in the UE transmitter is greater than the $ULBW_{CFR/DPD}$, CFR/DPD is not used.

The partial bandwidth CFR/DPD allows to keep the gNode B and UE transmitter complexity low while still providing coverage and transmission range or transmission distance benefit. When a larger transmission range or transmission distance is desired on the downlink or uplink, a small bandwidth within the $DLBW_{CFR/DPD}$ or $ULBW_{CFR/DPD}$ can respectively be used by the gNodeB or the UE to pump more transmission power while still meeting the regulatory requirements of adjacent channel leakage ratio (ACLR).

Figure 7A:
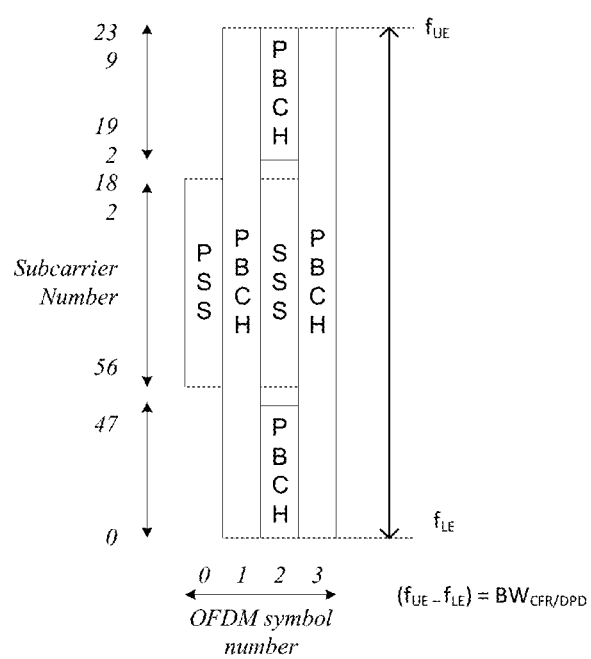
FIGS. 7A-7B illustrate transmission of SSB in accordance with disclosed embodiments.
Figure 7B:
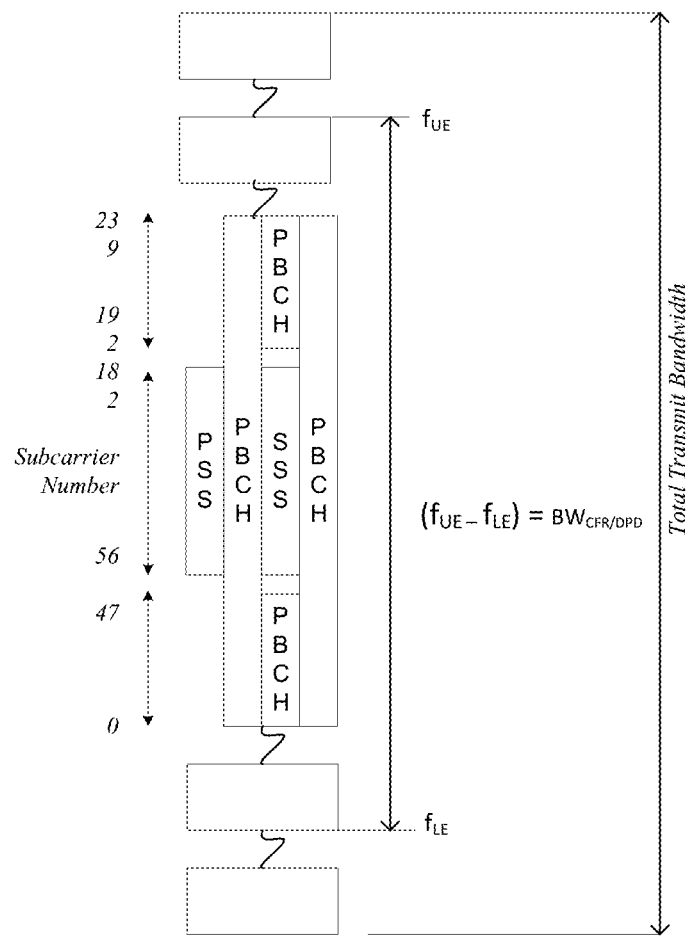

In 3GPP 5G-NR standard, a SS Block (SSB) refers to Synchronization Signal Block comprising: PSS (Primary Synchronization Signal), SSS (Secondary Synchronization Signal), Physical Broadcast Channel (PBCH) data transmission and PBCH (Demodulation Reference Signals). FIG. 7A illustrates transmission of SSB where the $BW_{CFR/DPD}$ is set equal to the bandwidth of the SSB. This allows transmission of the SSB with larger transmit power providing greater coverage and performance for the system. FIG. 7B illustrates another embodiment of the present disclosure where $BW_{CFR/DPD}$ is set greater than the bandwidth of the SSB but smaller than the total system bandwidth.

Figure 8A:
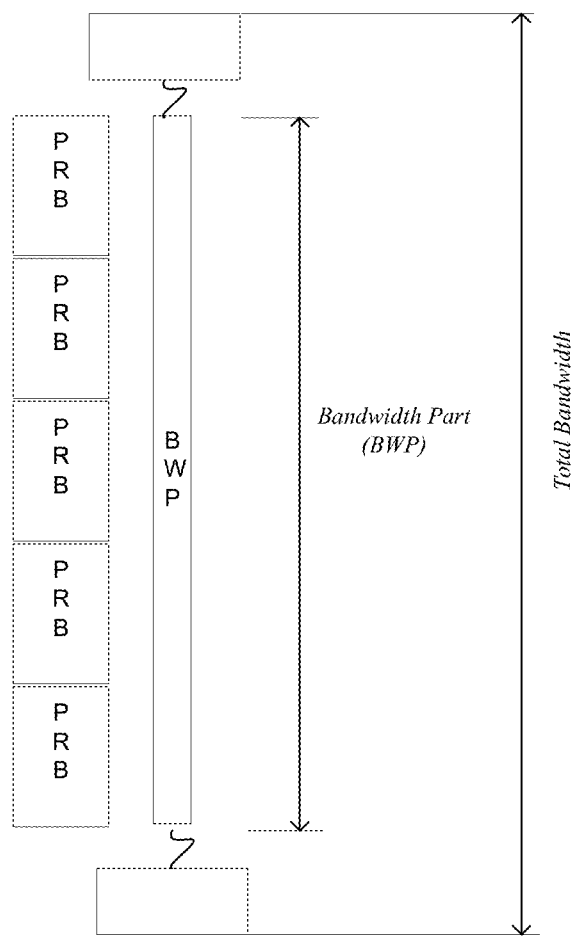
FIG. 8A illustrates BWP in accordance with disclosed embodiments.

In 3GPP standard, a bandwidth part (BWP) consists of a group of contiguous Physical Resource Blocks (PRBs) as illustrated in FIG. 8A. Referring to FIG. 8A, the bandwidth configured for a BWP is generally smaller than the total system bandwidth. A PRB comprises multiple OFDM sub-carriers. The bandwidth part may or may not contain SS block. Each bandwidth part (BWP) may have its own numerology (i.e. cyclic prefix length and subcarrier spacing etc). One or multiple bandwidth part configurations for each component carrier can be configured for a UE. However, only one BWP in downlink and one in uplink is active at a given time instant. In other words, a UE is only assumed to receive/transmit within active downlink/uplink bandwidth part using the associated numerology.

Figure 8B:
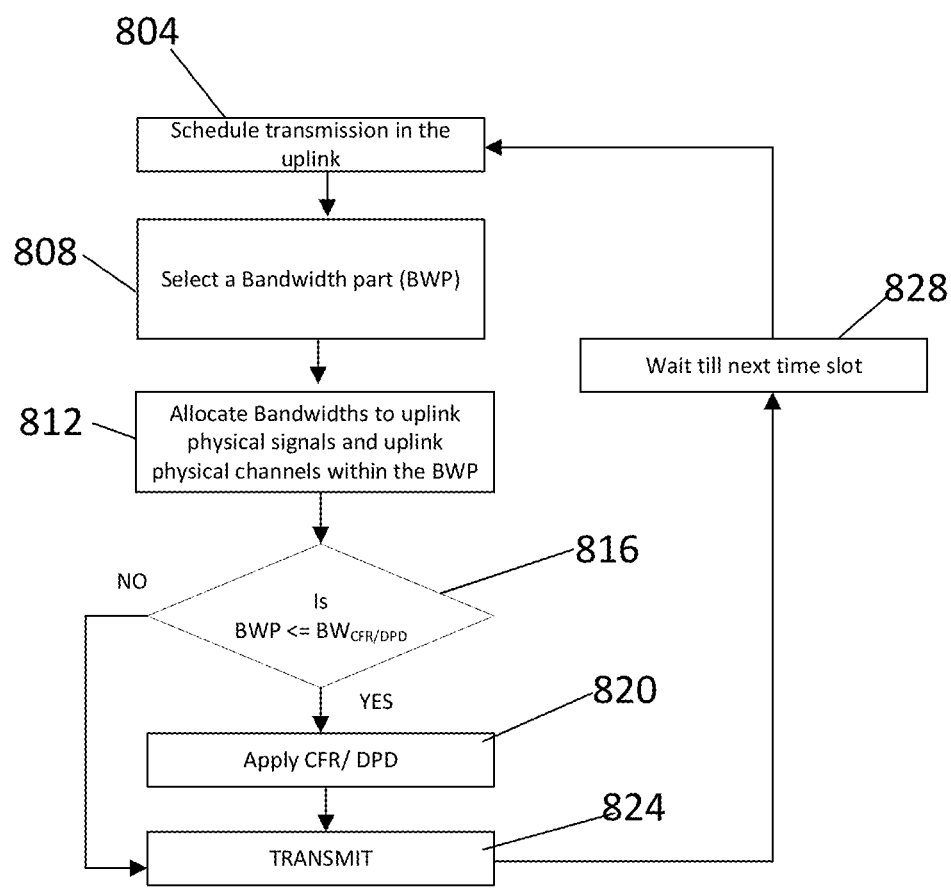
FIG. 8B is a functional block diagram illustrating example blocks executed to implement one aspect of the present disclosure.

FIG. 8B is a functional block diagram illustrating example blocks executed to implement one aspect of the present disclosure. In block 804, a transmission is scheduled for the UE in the uplink. In block 808, a bandwidth part is selected for transmission by the UE. In block 812, For example, transmission bandwidth is allocated for the uplink physical channels and the uplink physical signals within the frequency range of the BWP. In block 816, a determination is made if $BWP \leq BW_{CFR/DPD}$ Here BWP refers to the bandwidth or frequency range of the selected bandwidth part (BWP).

If $BWP \leq BW_{CFR/DPD}$, in block 820 the CFR and DPD modules are enabled and CFR/DPD are applied. In block 824, the transmitter 304 transmits the signals, and in block 828 the transmitter waits until the next time slot prior to transmission. In block 816, if $BWP > BW_{CFR/DPD}$, the transmitter 304 disables or de-activates the CFR and DPD modules and transmits signals in block 824.

Figure 9:
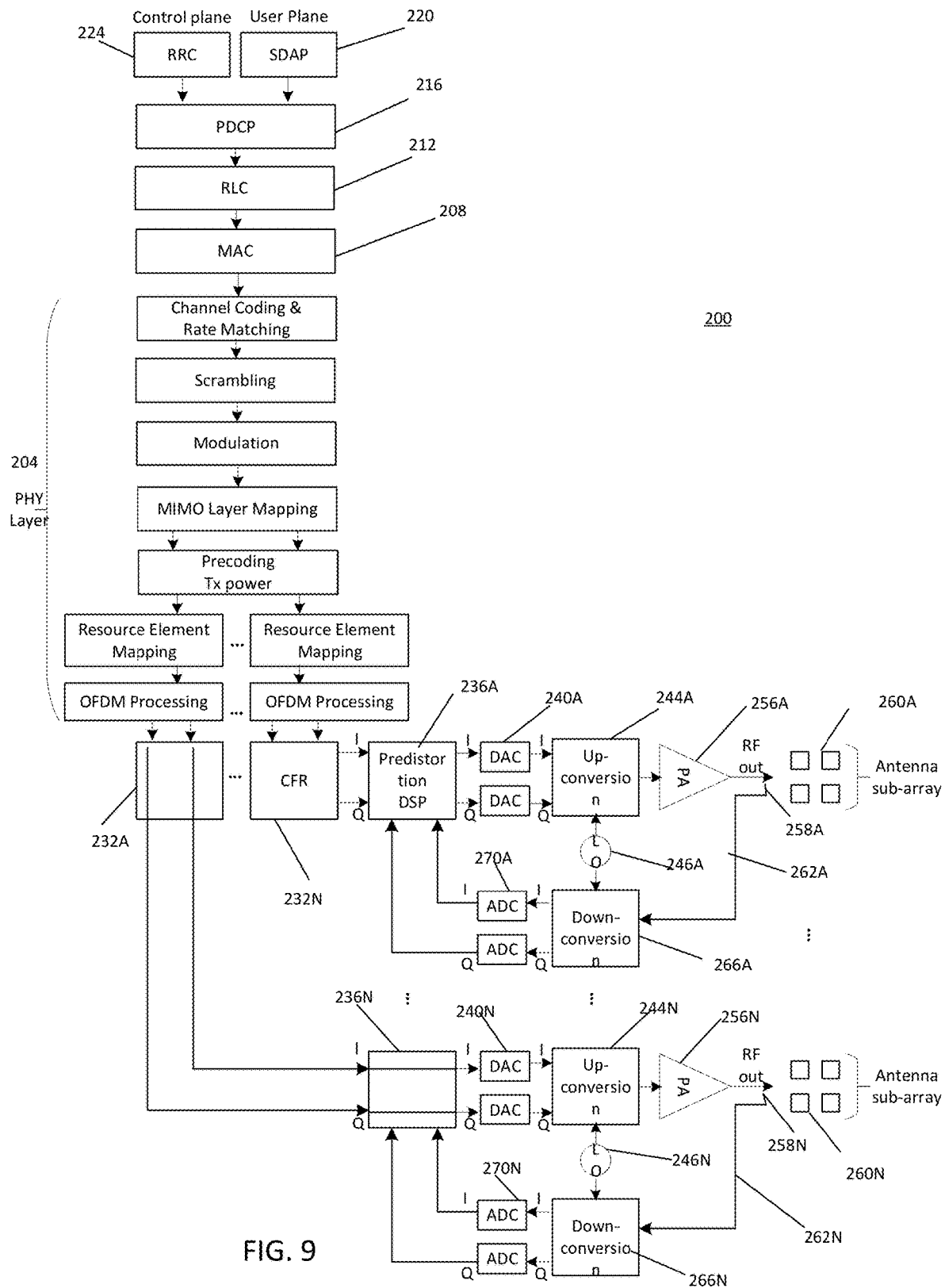
FIG. 9 is a block diagram of a transmitter.

FIG. 9 is a block diagram of the transmitter 200 according to embodiments of the present disclosure where both CFR and DPD or one of them can be applied to only a subset of the MIMO transmit chains to reduce complexity. In this exemplary embodiment, although the transmitter 200 includes the CFR modules 232A-232N, only the CFR module 232N is enabled or activated while the remaining CFR modules are de-activated or bypassed. It will be understood that embodiments of the present disclosure may be operated so that one or more CFR modules may be enabled or activated while the remaining CFR modules may be de-activated or bypassed. Also, the transmitter 200 includes the DPD modules 236A-236N, but only the DPD module 236A is enabled or activated while the remaining DPD modules are de-activated or bypassed. It will be understood that embodiments of the present disclosure may be operated so that one or more DPD modules may be enabled or activated while the remaining DPD modules may be de-activated or bypassed.

FIG. 10A illustrates a front view of a user equipment (UE) such as, for example, a smart phone 1004. The smart phone 1004 is configured to operate using CFR/DPD technique in accordance with the present disclosure.

FIG. 10B illustrates various components or modules inside the smart phone 1004. The smartphone 1004 includes four antenna arrays, Antenna Array1, Antenna Array2, Antenna Array3, and Antenna Array4, powered by respective power amplifiers 1020, 1022, 1024, and 1026. In some embodiments, the antenna arrays may implement dual-polarized antennas in which case each polarization is fed by a separate power amplifier. A DPD observation path (shown in dotted line) is provided for each power amplifier. However, to reduce complexity, a CFR/DPD module 1030 and ADC/DAC module 1034 are shared among four transmit chains. Each transmit chain includes an antenna array, a power amplifier and other related components. Note that each transmit chain may further have two sub-chains to support dual-polarized antenna arrays. For example, at a given time, a single transmit chain can be selected for transmission with CFR/DPD applied to that chain. A switch 1038 is used to connect the selected transmit and the DPD observation paths to the ADC/DAC module 1034 and in turn to the CFR/DPD module 1030.

Figure 11:
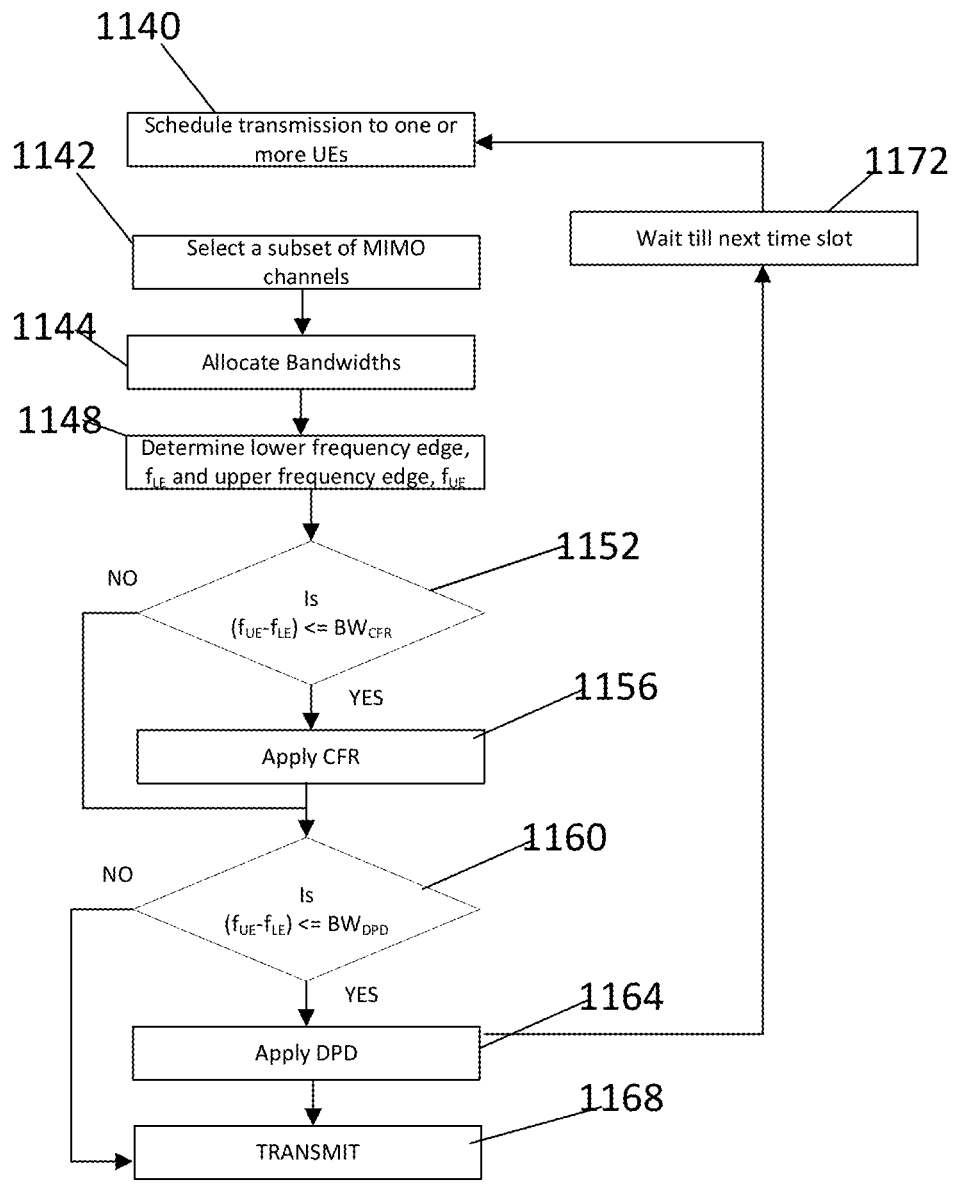
FIG. 11 is a functional block diagram illustrating example blocks executed to implement yet another aspect of the present disclosure.

FIG. 11 is a functional block diagram illustrating example blocks executed to implement yet another aspect of the present disclosure. In some embodiments of the present disclosure, a transmitter is configured for MIMO communications, and thus includes a plurality of MIMO channels. The functional block diagram illustrated in FIG. 11 is applicable to wireless transmitters configured for MIMO communications.

Referring to FIG. 11, in block 1440, the transmitter schedules transmission to one or more UEs. In block 1142, a subset of MIMO channels are selected, and in block 1144 bandwidths are allocated for the subset of MIMO channels. The bandwidths may be allocated based on the bandwidth support capability, observed channel quality of the particular bandwidth part, required data rates and other Quality of Service (QoS) parameters.

In block 1148, lower frequency edge $f_{LE}$ and upper frequency edge $f_{UE}$ of the allocated bandwidths are determined. In block 1152, a determination is made if $(f_{UE}-f_{LE})$ is less than or equal to a second bandwidth threshold value. The second bandwidth threshold value may be determined based on may be determined using a one or more parameter values of the transmitter, including the subset of MIMO channels. For example, the second bandwidth threshold value may be $BW_{CFR}$, wherein $BW_{CFR}$ is the maximum estimated signal bandwidth that a transmitter is configured to apply CFR on. If $(f_{UE}-f_{LE}) \leq BW_{CFR}$, in block 1156 CFR is applied to one or more selected MIMO channels.

In some embodiments of the disclosure, CFR modules which are used to apply crest factor reduction on the MIMO channels may be implemented in hardware, in firmware, in a software module executed by a processor or in a combination of the three. By way of example, not as limitation, the CFR modules may be implemented as one or more virtual machines shared by one or more MIMO channels of one or more transmitters in a wireless communications network. The virtual machines may be implemented in a software module which may reside in RAM memory, flash memory, ROM memory, EPROM memory, registers, hard disk, a removable disk, a CD-ROM, or any other form of storage known in the art.

In block 1152, if $(f_{UE}-f_{LE})>BW_{CFR}$, CFR is not applied to the one or more MIMO channels. In block 1160, a determination is made if $(f_{UE}-f_{LE})$ is less than or equal to a third bandwidth threshold value. The third bandwidth threshold value may be determined based on may be determined using a one or more parameter values of the transmitter, including the subset of MIMO channels. For example, the third bandwidth threshold value may be $BW_{DPD}$, wherein $BW_{DPD}$ is the maximum estimated signal bandwidth that a transmitter is configured to apply digital pre-distortion on. Note $BW_{DPD}$ maybe different than $BW_{CFR}$. If $(f_{UE}-f_{LE})$ $BW_{DPD}$, in block 1164 digital pre-distortion is applied.

In some embodiments of the disclosure, DPD modules which are used to apply digital pre-distortion on the MIMO channels may be implemented in hardware, in firmware, in a software module executed by a processor or in a combination of the three. By way of example, not as limitation, the DPD modules may be implemented as one or more virtual machines shared by one or more MIMO channels of one or more transmitters in a wireless communications network. The virtual machines may be implemented in a software module which may reside in RAM memory, flash memory, ROM memory, EPROM memory, registers, hard disk, a removable disk, a CD-ROM, or any other form of storage known in the art.

In block 1168, the transmitter transmits the signals, and in block 1172 the transmitter waits until the next time slot prior to transmission. In block 1160, if $(f_{UE}-f_{LE})>BW_{DPD}$, digital pre-distortion is not applied, and in block 1168 the transmitter transmit the signals without application of digital pre-distortion.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above in general terms of their functionality. Whether such functionality is implemented as hardware or software depends upon the particular application and design constraints imposed on the overall system Those of skill may implement the described functionality in varying ways for each particular application, but such implementation decision should not be interpreted as causing a departure from the scope of the present disclosure.

The various illustrative logical blocks, modules and circuits described in connection with the disclosure herein may be implemented or performed with a general purpose processor, a digital signal processor (DSP), an application specific integrated circuit (ASIC), a field programmable gate array (FPGA), or other programmable logic device, transistor logic, discrete hardware components, or any combination thereof designed to perform the functions described herein. A general purpose processor may be a microprocessor, a controller, a microcontroller or a state machine.

The steps of a method or algorithm described in connection with the disclosure herein may be embodied in hardware, in a software module executed by a processor or in a combination of the two. A software module may reside in RAM memory, flash memory, ROM memory, EPROM memory, registers, hard disk, a removable disk, a CD-ROM, or any other form of storage known in the art. An exemplary storage medium is coupled to the processor such that the processor can read information from, and write information to, the storage medium. In the alternative, the storage medium may be integral to the processor. The processor and the storage medium may reside in an ASIC, or the processor and the storage medium may reside in discrete components.

In one or more exemplary designs, the functions described may be implemented in hardware, software, firmware, or any combination thereof. If implemented in software, the functions may be stored on or transmitted over as one or more instructions or code on a computer-readable medium. Computer-readable medium includes both non-transitory computer storage media and communication media including any medium that facilitates transfer of a computer program from one location to another. A non-transitory storage media may be any available media that can be accessed by a general purpose or special purpose computer. By way of example, and not limitation, such non-transitory computer readable media can comprise RAM, ROM, EEPROM, CD-ROM, optical disk storage, magnetic disk storage, DVD, or any other medium that can be used to store program code means in the form of instructions or data structures and that can be accessed by a general purpose or special purpose processor. Any connection is termed a computer-readable medium. If the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk, as used herein, includes CD, laser disc, optical disc, DVD, floppy disk and other disks that reproduce data.

The previous description of disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and features disclosed herein.

The invention claimed is:

1. A method for wireless communication, comprising:
allocating a transmission bandwidth for transmission to a first user equipment (UE);
determining if the allocated transmission bandwidth is less than or equal to a first bandwidth threshold value;
if the allocated transmission bandwidth is less than or equal to the first bandwidth threshold value, digitally pre-distorting transmit signals and transmitting the digitally pre-distorted transmit signals to the first UE; and
if the allocated transmission bandwidth is not less than or equal to the first bandwidth threshold value, transmitting to the first UE without digitally pre-distorting the signals.

2. The method of claim 1, wherein the first bandwidth threshold value is the maximum estimated $BW_{DPD}$, wherein the maximum estimated $BW_{DPD}$ is the maximum estimated signal bandwidth a transmitter is configured to digitally pre-distort.

3. The method of claim 1, further comprising applying digital crest factor reduction to the transmit signals if the allocated transmission bandwidth is less than or equal to a second bandwidth threshold value.

4. The method of claim 1, further comprising:
scheduling a transmission to the first UE in a first transmission time interval (TTI);
transmitting the digitally pre-distorted transmit signals in the first TTI to the first UE if the allocated transmission bandwidth is less than or equal to the maximum estimated $BW_{DPD}$; and
transmitting to the first UE without digitally pre-distorting the transmit signals in the first TTI if the allocated transmission bandwidth is not less than or equal to the maximum estimated $BW_{DPD}$.

5. The method of claim 1, further comprising:
scheduling a transmission to a second UE in a second TTI;
allocating a transmission bandwidth for transmission to the second UE;
determining if the allocated transmission bandwidth to the second UE is less than or equal to the maximum estimated $BW_{DPD}$, wherein the maximum estimated $BW_{DPD}$ is the maximum estimated signal bandwidth that a transmitter is configured to digitally pre-distort;
if the allocated transmission bandwidth is less than or equal to the maximum estimated $BW_{DPD}$, digitally pre-distorting transmit signals and transmitting the digitally pre-distorted transmit signals to the second UE in the second TTI; and
if the allocated transmission bandwidth is not less than or equal to the maximum estimated $BW_{DPD}$, transmitting to the second UE in the second TTI without digitally pre-distorting the signals.

6. The method of claim 1, further comprising:
determining a non-linear coefficient of at least one power amplifier; and
digitally pre-distorting the transmit signals using the non-linear coefficient of the power amplifier.

7. The method of claim 1, further comprising:
digitally pre-distorting the transmit signals using the non-linear coefficient; and
amplifying the digitally pre-distorted signals by a power amplifier, wherein digital pre-distortion modifies non-linear response of the power amplifier.

8. The method of claim 1, wherein the transmit signals are in a millimeter wave band.

9. The method of claim 1, wherein the transmit signals are in a sub-7 GHz frequency band.

10. The method of claim 1, wherein the UE is a communication device.

11. The method of claim 1, wherein the transmitter is a radio base station.

12. The method of claim 3, wherein the second bandwidth threshold value is the maximum estimated $BW_{CFR}$, wherein the maximum estimated $BW_{CFR}$ is the maximum estimated signal bandwidth on which a transmitter is configured to apply digital crest factor reduction.

13. A method for wireless communication, comprising:
scheduling transmissions to at least first and second user equipment (UEs) in a first transmission time interval (TTI);
allocating respective transmission bandwidths for transmission in the first TTI to the first and second UEs;
determining if the total allocated transmission bandwidth in the first TTI is less than or equal a maximum estimated $BW_{DPD}$, wherein the maximum estimated $BW_{DPD}$ is the maximum estimated signal bandwidth that a transmitter is configured to digitally pre-distort;

if the total allocated transmission bandwidth in the first TTI is less than or equal to the maximum estimated $BW_{DPD}$, digitally pre-distorting transmit signals and transmitting the digitally pre-distorted transmit signals to the first and second UEs in the first TTI; and
if the total allocated transmission bandwidth in the first TTI is not less than or equal to the maximum estimated $BW_{DPD}$, transmitting to the first and second UEs without digitally pre-distorting the signals.

14. The method of claim 13, further comprising:
scheduling a transmission to at least a third UE in a second TTI;
allocating a transmission bandwidth for transmission to the third UE;
determining if the allocated transmission bandwidth to the third UE is less than or equal to the maximum estimated $BW_{DPD}$, wherein the maximum estimated $BW_{DPD}$ is the maximum estimated signal bandwidth that a transmitter is configured to digitally pre-distort;
if the allocated transmission bandwidth is less than or equal to the maximum estimated $BW_{DPD}$, digitally pre-distorting transmit signals and transmitting the digitally pre-distorted transmit signals to the third UE in the second TTI; and
if the allocated transmission bandwidth is not less than or equal to the maximum estimated $BW_{DPD}$, transmitting to the third UE in the second TTI without digitally pre-distorting the signals.

15. The method of claim 13, further comprising:
determining a lower frequency edge ($f_{LE}$) and an upper frequency edge ($f_{UE}$) of the allocated transmission bandwidths for the UEs; and
determining the total allocated transmission bandwidth, wherein the total allocated transmission bandwidth is equal to ($f_{UE}-f_{LE}$).

16. The method of claim 13, further comprising applying digital crest factor reduction to the transmit signals if the allocated transmission bandwidth is less than or equal to the maximum estimated $BW_{CFR}$, wherein the maximum estimated $BW_{CFR}$ is the maximum estimated signal bandwidth on which a transmitter is configured to apply digital crest factor reduction.

17. The method of claim 13, further comprising:
determining a non-linear coefficient of at least one power amplifier; and
digitally pre-distorting the transmit signals using the non-linear coefficient of the power amplifier.

18. The method of claim 13, further comprising:
digitally pre-distorting the transmit signals using the non-linear coefficient; and
amplifying the digitally pre-distorted signals by a power amplifier, wherein digital pre-distortion modifies non-linear response of the power amplifier.

19. The method of claim 13, further comprising estimating the maximum estimated $BW_{CFR}$ using at least one parameter value of the transmitter.

20. The method of claim 13, further comprising estimating the maximum estimated $BW_{DPD}$ using at least one parameter value of the transmitter.

21. The method of claim 13, wherein the transmit signals are in a millimeter wave band.

22. The method of claim 13, wherein the transmit signals are in a sub-7 GHz frequency band.

23. The method of claim 13, wherein the UE is a communication device.

24. The method of claim 13, wherein the UE is a mobile phone.

25. The method of claim 13, wherein the transmitter is a radio base station.

26. A method for wireless communication, comprising:
scheduling transmission to at least a first user equipment (UE) in a first transmission time interval (TTI);
allocating a transmission bandwidth for transmission in the first TTI to the first UE;
determining if the total allocated transmission bandwidth in the first TTI is less than or equal to a maximum estimated $BW_{DPD}$, wherein the maximum estimated $BW_{DPD}$ is the maximum estimated signal bandwidth that a transmitter is configured to digitally pre-distort;
if the total allocated transmission bandwidth in the first TTI is less than or equal to the maximum estimated $BW_{DPD}$, digitally pre-distorting transmit signals and transmitting the digitally pre-distorted transmit signals to the first UE in the first TTI;
if the total allocated transmission bandwidth in the first TTI is not less than or equal to the maximum estimated $BW_{DPD}$, transmitting to the first UE without digitally pre-distorting the signals;
scheduling a transmission to at least a second UE in a second TTI;
allocating a transmission bandwidth for transmission to the second UE;
determining if the total allocated transmission bandwidth in the second TTI is less than or equal to the maximum estimated $BW_{DPD}$;
if the allocated transmission bandwidth in the second TTI is less than or equal to the maximum estimated $BW_{DPD}$, digitally pre-distorting transmit signals and transmitting the digitally pre-distorted transmit signals to the second UE in the second TTI; and
if the allocated transmission bandwidth is not less than or equal to the maximum estimated $BW_{DPD}$, transmitting to the second UE in the second TTI without digitally pre-distorting the signals.

27. The method of claim 26, further comprising applying digital crest factor reduction to the transmit signals if the total allocated transmission bandwidth is less than or equal to the maximum estimated $BW_{CFR}$.

28. The method of claim 26, further comprising estimating the maximum estimated $BW_{DPD}$ using at least one parameter value of the transmitter.

29. The method of claim 26, further comprising estimating the maximum estimated $BW_{CFR}$ using at least one parameter value of the transmitter.

30. An apparatus configured for wireless communication, comprising:
means for allocating a transmission bandwidth for transmission to a first user equipment (UE);
means for determining if the allocated transmission bandwidth is less than or equal to a maximum estimated $BW_{DPD}$, wherein the maximum estimated $BW_{CFR/DPD}$ is the maximum estimated signal bandwidth that a transmitter is configured to digitally pre-distort;
means for digitally pre-distorting transmit signals and transmitting the digitally pre-distorted transmit signals to the first UE, wherein the digitally pre-distorted signals are transmitted if the allocated transmission bandwidth is less than or equal to the maximum estimated $BW_{DPD}$; and
means for transmitting to the first UE without digitally pre-distorting the signals, wherein the signals are transmitted without digital pre-distortion if the allocated transmission bandwidth is not less than or equal to the maximum estimated $BW_{DPD}$.

31. The apparatus of claim 30, further comprising means for applying digital crest factor reduction to the transmit signals if the allocated transmission bandwidth is less than or equal to the maximum estimated $BW_{CFR}$.

32. The apparatus of claim 30, further comprising:
means for scheduling a transmission to the first UE in a first transmission time interval (TTI);
means for transmitting the digitally pre-distorted transmit signals in the first TTI to the first UE if the allocated transmission bandwidth is less than or equal to the maximum estimated $BW_{DPD}$; and
means for transmitting to the first UE without digitally pre-distorting the transmit signals in the first TTI if the allocated transmission bandwidth is not less than or equal to the maximum estimated $BW_{DPD}$.

33. The apparatus of claim 30, further comprising:
means for scheduling a transmission to a second UE in a second TTI;
means for allocating a transmission bandwidth for transmission to the second UE;
means for determining if the allocated transmission bandwidth to the second UE is less than or equal to the maximum estimated $BW_{DPD}$, wherein the maximum estimated $BW_{DPD}$ is the maximum estimated signal bandwidth that a transmitter is configured to digitally pre-distort;
means for digitally pre-distorting transmit signals and transmitting the digitally pre-distorted transmit signals to the second UE in the second TTI if the allocated transmission bandwidth is less than or equal to the maximum estimated $BW_{DPD}$; and
means for transmitting to the second UE in the second TTI without digitally pre-distorting the signals if the allocated transmission bandwidth is not less than or equal to the maximum estimated $BW_{DPD}$.

34. The apparatus of claim 30, further comprising means for estimating the maximum estimated $BW_{DPD}$ using at least one parameter value of the transmitter.

35. The apparatus of claim 30, further comprising means for estimating the maximum estimated $BW_{CFR}$ using at least one parameter value of the transmitter.

* * * * *